US011290323B2

(12) United States Patent
Jiang et al.

(10) Patent No.: US 11,290,323 B2
(45) Date of Patent: Mar. 29, 2022

(54) CONFIGURING MULTI-CHANNEL TRANSMISSION FOR RANGING ACCURACY

(71) Applicant: QUALCOMM Incorporated, San Diego, CA (US)

(72) Inventors: Libin Jiang, Bridgewater, NJ (US); Jubin Jose, Belle Mead, NJ (US); Shailesh Patil, San Diego, CA (US); Junyi Li, Chester, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 15/917,424

(22) Filed: Mar. 9, 2018

(65) Prior Publication Data

US 2018/0302280 A1 Oct. 18, 2018

(30) Foreign Application Priority Data

Apr. 13, 2017 (GR) .............................. 20170100177

(51) Int. Cl.
*H04W 4/00* (2018.01)
*H04L 41/0806* (2022.01)
(Continued)

(52) U.S. Cl.
CPC ............ *H04L 41/0806* (2013.01); *G01S 5/00* (2013.01); *H04L 41/0846* (2013.01); *H04W 4/02* (2013.01); *H04W 4/40* (2018.02); *H04W 72/044* (2013.01)

(58) Field of Classification Search
CPC ... G01S 5/00; H04L 41/0806; H04L 41/0846; H04W 4/02; H04W 4/40; H04W 72/044
See application file for complete search history.

(56) References Cited

U.S. PATENT DOCUMENTS

| 6,876,326 B2 | 4/2005 | Martorana |
| 2003/0123877 A1* | 7/2003 | Lo ........................ H04B 10/532 398/34 |

(Continued)

FOREIGN PATENT DOCUMENTS

| CN | 103650378 A | 3/2014 |
| CN | 103797882 A | 5/2014 |

(Continued)

OTHER PUBLICATIONS

International Search Report and Written Opinion—PCT/US2018/022700—ISA/EPO—dated Jun. 12, 2018.
Taiwan Search Report—TW107108809—TIPO—dated Jan. 14, 2022.

Primary Examiner — Abdelillah Elmejjarmi
(74) Attorney, Agent, or Firm — Holland & Hart LLP

(57) ABSTRACT

Methods, systems, and devices for wireless communication are described. A wireless device may identify a configuration for transmitting ranging signals in a vehicle-based communication system. The configuration may identify a plurality of channels to be used for the ranging signals and timing for the ranging signals. The wireless device may transmit the configuration to a receiver and transmit ranging signals based at least in part on the configuration. The receiver may use the ranging signals to determine a distance between the receiver and the wireless device. The receiver may use the determined distance to update positioning information or operate a motor vehicle.

78 Claims, 14 Drawing Sheets

(51) Int. Cl.
*H04W 72/04* (2009.01)
*G01S 5/00* (2006.01)
*H04L 41/084* (2022.01)
*H04W 4/40* (2018.01)
*H04W 4/02* (2018.01)

(56) References Cited

U.S. PATENT DOCUMENTS

| | | | |
|---|---|---|---|
| 2003/0162547 A1* | 8/2003 | McNair | G01S 5/0226 |
| | | | 455/456.3 |
| 2009/0115658 A1* | 5/2009 | Zimmerman | G01S 19/44 |
| | | | 342/357.27 |
| 2011/0002288 A1 | 1/2011 | Lee et al. | |
| 2011/0069672 A1* | 3/2011 | Lee | H04L 5/0053 |
| | | | 370/330 |
| 2012/0129551 A1 | 5/2012 | Islam | |
| 2013/0053084 A1* | 2/2013 | Cho | H04W 4/50 |
| | | | 455/515 |
| 2013/0079031 A1* | 3/2013 | Kuhn | H04W 4/023 |
| | | | 455/456.1 |
| 2014/0088429 A1* | 3/2014 | Lomes | A61B 8/4483 |
| | | | 600/444 |
| 2015/0131761 A1* | 5/2015 | Potter | H04J 11/0046 |
| | | | 375/340 |
| 2015/0256963 A1* | 9/2015 | Dahlen | H04W 4/80 |
| | | | 455/41.2 |
| 2016/0076894 A1* | 3/2016 | Choi | B60W 30/00 |
| | | | 701/461 |
| 2016/0270109 A1* | 9/2016 | Jiang | H04W 72/1268 |
| 2016/0277890 A1 | 9/2016 | Nallampatti et al. | |
| 2017/0013582 A1* | 1/2017 | Takekawa | H04W 56/0045 |
| 2017/0031001 A1 | 2/2017 | Calvarese et al. | |
| 2017/0061788 A1* | 3/2017 | Burke | G08G 1/0112 |
| 2017/0075647 A1* | 3/2017 | Mei | H04L 65/1083 |
| 2017/0086086 A1 | 3/2017 | Bhatia et al. | |
| 2017/0102474 A1 | 4/2017 | Gulllot, III | |
| 2017/0234961 A1 | 8/2017 | Steltz et al. | |
| 2017/0257885 A1 | 9/2017 | Zhang et al. | |
| 2017/0286730 A1* | 10/2017 | Sadr | G01S 5/30 |
| 2018/0054743 A1* | 2/2018 | Lee | H04W 16/26 |
| 2018/0092103 A1* | 3/2018 | Gurney | H04W 72/0473 |
| 2018/0176174 A1* | 6/2018 | Sherman | H04L 45/302 |
| 2018/0241471 A1* | 8/2018 | Khotimsky | H04B 10/27 |
| 2019/0116598 A1* | 4/2019 | Tang | H04W 92/10 |
| 2020/0305116 A1* | 9/2020 | Berggren | H04W 64/006 |

FOREIGN PATENT DOCUMENTS

| | | |
|---|---|---|
| EP | 3133842 A1 | 2/2017 |
| WO | WO-2013112428 A1 | 8/2013 |
| WO | WO-2016028405 A1 | 2/2016 |
| WO | WO-2016148810 A1 | 9/2016 |

* cited by examiner

CONFIGURING MULTI-CHANNEL TRANSMISSION FOR RANGING ACCURACY

CROSS REFERENCES

The present Application for Patent claims priority to Greek Patent Application No. 20170100177 by Jiang, et al., entitled "Configuring Multi-Channel Transmission For Ranging Accuracy," filed Apr. 13, 2017, assigned to the assignee hereof, which is incorporated by reference herein.

INTRODUCTION

The following relates generally to wireless communication, and more specifically to configuring multi-channel transmission for ranging accuracy.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may also be used in a vehicle-based communication system. For example, a technique called ranging may be utilized in advanced driver assistance systems. Ranging may include wirelessly communicating with other vehicles to establish relative positioning between the vehicles. Ranging may be used to assist navigation systems in autonomous vehicles.

SUMMARY

The described techniques relate to improved methods, systems, devices, or apparatuses that support configuring multi-channel transmission for ranging accuracy. Generally, the described techniques provide for a first wireless device that identifies a configuration for transmitting ranging signals in a vehicle-based communication system. The configuration may identify a plurality of channels to be used for the ranging signals and a timing for the ranging signals. The first wireless device may transmit the configuration to the second wireless device. The first wireless device may then transmit ranging signals to the second wireless device in accordance with the configuration. The second wireless device may identify the ranging signals based at least in part on the configuration and determine a distance between the first wireless device and the second wireless device based at least in part on the ranging signals. The second wireless device may use the determined distance to update positioning information or operate a motor vehicle.

A method of wireless communication is described. The method may include identifying, by a transmitter, a configuration for transmitting ranging signals in a vehicle-based communication system, the configuration identifying a plurality of channels to be used for the ranging signals and timing for the ranging signals and transmitting the configuration to a receiver.

An apparatus for wireless communication is described. The apparatus may include means for identifying, by a transmitter, a configuration for transmitting ranging signals in a vehicle-based communication system, the configuration identifying a plurality of channels to be used for the ranging signals and timing for the ranging signals and means for transmitting the configuration to a receiver.

Another apparatus for wireless communication is described. The apparatus may include a processor, memory in electronic communication with the processor, and instructions stored in the memory. The instructions may be operable to cause the processor to identify, by a transmitter, a configuration for transmitting ranging signals in a vehicle-based communication system, the configuration identifying a plurality of channels to be used for the ranging signals and timing for the ranging signals and transmit the configuration to a receiver.

A non-transitory computer readable medium for wireless communication is described. The non-transitory computer-readable medium may include instructions operable to cause a processor to identify, by a transmitter, a configuration for transmitting ranging signals in a vehicle-based communication system, the configuration identifying a plurality of channels to be used for the ranging signals and timing for the ranging signals and transmit the configuration to a receiver.

Some examples of the method, apparatus, and non-transitory computer-readable medium described above may further include processes, features, means, or instructions for transmitting the ranging signals on the plurality of channels based at least in part on the configuration.

Some examples of the method, apparatus, and non-transitory computer-readable medium described above may further include processes, features, means, or instructions for transmitting the ranging signals simultaneously on the plurality of channels based at least in part on the configuration.

Some examples of the method, apparatus, and non-transitory computer-readable medium described above may further include processes, features, means, or instructions for transmitting the ranging signals simultaneously on the plurality of channels comprises using carrier aggregation.

Some examples of the method, apparatus, and non-transitory computer-readable medium described above may further include processes, features, means, or instructions for transmitting the ranging signals on the plurality of channels during a transmission interval based at least in part on the configuration, each of the ranging signals being transmitted during a different time period during the transmission interval.

Some examples of the method, apparatus, and non-transitory computer-readable medium described above may further include processes, features, means, or instructions for receiving, from the receiver, an indication of a time elapsed between transmission and receipt of the ranging signals, an indication of an arrival time of the ranging signals, or a combination thereof.

Some examples of the method, apparatus, and non-transitory computer-readable medium described above may further include processes, features, means, or instructions for updating a positioning information based at least in part on the information received from the receiver.

In some examples of the method, apparatus, and non-transitory computer-readable medium described above, transmitting the configuration to the receiver comprises: transmitting the configuration to the receiver in a broadcast message.

In some examples of the method, apparatus, and non-transitory computer-readable medium described above, transmitting the configuration to the receiver comprises: transmitting the configuration to the receiver in a dedicated message addressed to the receiver.

In some examples of the method, apparatus, and non-transitory computer-readable medium described above, the configuration comprises a transmitter identifier corresponding to the transmitter, an identification of a channel for each of the ranging signals, a data sequence for each of the ranging signals, a time schedule for the ranging signals, or a combination thereof.

Some examples of the method, apparatus, and non-transitory computer-readable medium described above may further include processes, features, means, or instructions for transmitting each of the ranging signals on the channel identified in the configuration.

Some examples of the method, apparatus, and non-transitory computer-readable medium described above may further include processes, features, means, or instructions for transmitting the data sequence on each of the plurality of channels.

Some examples of the method, apparatus, and non-transitory computer-readable medium described above may further include processes, features, means, or instructions for transmitting the ranging signals according to the time schedule.

Some examples of the method, apparatus, and non-transitory computer-readable medium described above may further include processes, features, means, or instructions for transmitting offset information to the receiver, the offset information comprising phase offset information for one or more of the ranging signals, time offset information for one or more of the ranging signals, or a combination thereof.

In some examples of the method, apparatus, and non-transitory computer-readable medium described above, the offset information may be transmitted with the configuration.

In some examples of the method, apparatus, and non-transitory computer-readable medium described above, a motor vehicle comprises the transmitter and a road side unit comprises the receiver.

In some examples of the method, apparatus, and non-transitory computer-readable medium described above, the first motor vehicle comprises the transmitter and a second motor vehicle comprises the receiver.

In some examples of the method, apparatus, and non-transitory computer-readable medium described above, the transmitter comprises a base station or network entity.

A method of wireless communication is described. The method may include receiving, at a wireless device, signaling identifying a configuration for receiving ranging signals in a vehicle-based communication system, the configuration identifying a plurality of channels to be used for the ranging signals and timing for the ranging signals and receiving, based at least in part on the configuration, the ranging signals on the plurality of channels according to the configuration.

An apparatus for wireless communication is described. The apparatus may include means for receiving, at a wireless device, signaling identifying a configuration for receiving ranging signals in a vehicle-based communication system, the configuration identifying a plurality of channels to be used for the ranging signals and timing for the ranging signals and means for receiving, based at least in part on the configuration, the ranging signals on the plurality of channels according to the configuration.

Another apparatus for wireless communication is described. The apparatus may include a processor, memory in electronic communication with the processor, and instructions stored in the memory. The instructions may be operable to cause the processor to receive, at a wireless device, signaling identifying a configuration for receiving ranging signals in a vehicle-based communication system, the configuration identifying a plurality of channels to be used for the ranging signals and timing for the ranging signals and receive, based at least in part on the configuration, the ranging signals on the plurality of channels according to the configuration.

A non-transitory computer readable medium for wireless communication is described. The non-transitory computer-readable medium may include instructions operable to cause a processor to receive, at a wireless device, signaling identifying a configuration for receiving ranging signals in a vehicle-based communication system, the configuration identifying a plurality of channels to be used for the ranging signals and timing for the ranging signals and receive, based at least in part on the configuration, the ranging signals on the plurality of channels according to the configuration.

Some examples of the method, apparatus, and non-transitory computer-readable medium described above may further include processes, features, means, or instructions for receiving the ranging signals simultaneously on the plurality of channels based at least in part on the configuration.

Some examples of the method, apparatus, and non-transitory computer-readable medium described above may further include processes, features, means, or instructions for receiving the ranging signals on the plurality of channels during a reception interval based at least in part on the configuration, each of the ranging signals being received during a different time period during the reception interval.

Some examples of the method, apparatus, and non-transitory computer-readable medium described above may further include processes, features, means, or instructions for identifying the ranging signals based at least in part on the configuration.

In some examples of the method, apparatus, and non-transitory computer-readable medium described above, the configuration comprises a transmitter identifier corresponding to the transmitter, an identification of a channel for each of the ranging signals, a data sequence for each of the ranging signals, a time schedule for the ranging signals, or a combination thereof.

In some examples of the method, apparatus, and non-transitory computer-readable medium described above, identifying the ranging signals comprises: identifying the ranging signals based at least in part on the transmitter identifier included in the ranging signals.

In some examples of the method, apparatus, and non-transitory computer-readable medium described above, identifying the ranging signals comprises: identifying the ranging signals based at least in part on the channel identified in the configuration for each of the ranging signals.

In some examples of the method, apparatus, and non-transitory computer-readable medium described above, identifying the ranging signals comprises: identifying the ranging signals based at least in part on the data sequence included in the ranging signals.

In some examples of the method, apparatus, and non-transitory computer-readable medium described above, identifying the ranging signals comprises: identifying the ranging signals based at least in part on the time schedule for the ranging signals.

Some examples of the method, apparatus, and non-transitory computer-readable medium described above may further include processes, features, means, or instructions for determining, based at least in part on the ranging signals, a distance between the wireless device and a transmitter.

In some examples of the method, apparatus, and non-transitory computer-readable medium described above, determining the distance comprises: determining a transmission time for the ranging signals based at least in part on the configuration, the ranging signals, or a combination thereof. Some examples of the method, apparatus, and non-transitory computer-readable medium described above may further include processes, features, means, or instructions for determining an arrival time for the ranging signals. Some examples of the method, apparatus, and non-transitory computer-readable medium described above may further include processes, features, means, or instructions for determining the distance between the wireless device and the transmitter based at least in part on a difference between the transmission time and the arrival time.

In some examples of the method, apparatus, and non-transitory computer-readable medium described above, determining the arrival time comprises: determining a channel frequency response for each of the plurality of channels. Some examples of the method, apparatus, and non-transitory computer-readable medium described above may further include processes, features, means, or instructions for determining, based at least in part on the channel frequency response for each of the plurality of channels, a combined channel frequency response for the plurality of channels. Some examples of the method, apparatus, and non-transitory computer-readable medium described above may further include processes, features, means, or instructions for determining the arrival time based at least in part on the combined channel frequency response.

Some examples of the method, apparatus, and non-transitory computer-readable medium described above may further include processes, features, means, or instructions for updating positioning information based at least in part on the distance between the wireless device and the transmitter.

In some examples of the method, apparatus, and non-transitory computer-readable medium described above, a motor vehicle comprises the wireless device and a road side unit comprises the transmitter.

Some examples of the method, apparatus, and non-transitory computer-readable medium described above may further include processes, features, means, or instructions for operating a first motor vehicle based at least in part on the distance between the wireless device and the transmitter.

In some examples of the method, apparatus, and non-transitory computer-readable medium described above, a first motor vehicle comprises the wireless device and a second motor vehicle comprises the transmitter.

Some examples of the method, apparatus, and non-transitory computer-readable medium described above may further include processes, features, means, or instructions for receiving offset information, the offset information comprising phase offset information for one or more of the ranging signals, time offset information for one or more of the ranging signals, or a combination thereof.

In some examples of the method, apparatus, and non-transitory computer-readable medium described above, the offset information may be received with the configuration.

In some examples of the method, apparatus, and non-transitory computer-readable medium described above, the distance between the wireless device and the transmitter may be determined based at least in part on the offset information.

DETAILED DESCRIPTION

In vehicle-based communication systems, a motor vehicle may communicate with motor vehicles, road side units, and other wireless communication devices to assist with positioning and navigation. The accuracy of ranging may depend on the bandwidth of the ranging signal, with higher bandwidth leading to higher accuracy.

A wireless device in a vehicle-based communication system may transmit ranging signals over a plurality of channels in order to increase the available bandwidth and therefore increase the accuracy of ranging. In order for the receiving device to be able to identify the ranging signals in the plurality of channels, the wireless device may identify and transmit a configuration identifying the plurality of channels to be used for ranging signals and the timing for the ranging signals to the receiving device. The wireless device may then transmit the ranging signals. The ranging signals may be transmitted simultaneously, or may be transmitted in different time periods within a transmission interval. The distance between the wireless device and the receiving device may be calculated based at least in part on the ranging signals.

Aspects of the disclosure are initially described in the context of a wireless communications system. Aspects of the disclosure are then illustrated with communication flows and transmission diagrams. Aspects of the disclosure are further illustrated by and described with reference to apparatus diagrams, system diagrams, and flowcharts that relate to configuring multi-channel transmission for ranging accuracy.

Figure 1:
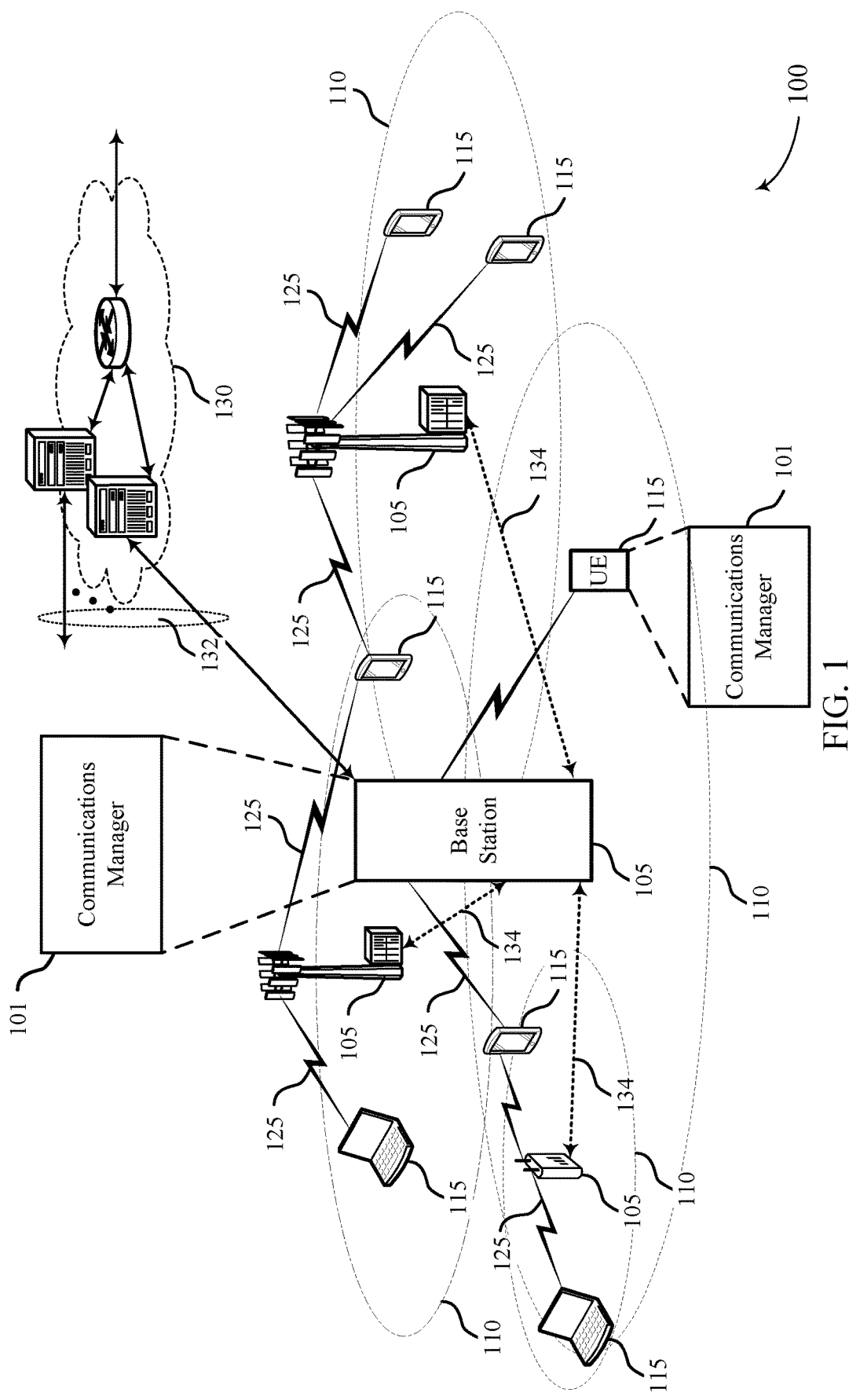
FIG. 1 illustrates an example of a system for wireless communication that supports configuring multi-channel transmission for ranging accuracy in accordance with aspects of the present disclosure.

FIG. 1 illustrates an example of a wireless communications system 100 in accordance with various aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. In some examples, a UE 115 may be a motor vehicle or a road side unit (RSU).

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 (e.g., eNodeBs (eNBs, network access devices, gNBs) 105-a, gNBs, or access node controllers (ANCs)) may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of network devices 105 and/or UEs 115 may include a communications manager 101, which may transmit or receive configuration and ranging signals in support of configuring multi-channel transmission for ranging accuracy in accordance with various aspects of the present disclosure.

The communications manager 101 may identify a configuration for transmitting ranging signals in a vehicle-based communication system. The configuration may identify a plurality of channels to be used for the ranging signals and timing for the ranging signals. The communications manager 101, together with the transmitter, may transmit the configuration to a receiving device.

The communications manager 101 may transmit the ranging signals on a plurality of channels based on the configuration. The communications manager 101 may transmit the ranging signals simultaneously, or may transmit the ranging signals during different time periods within a transmission interval. The transmission interval may be, for example, less than about 2 milliseconds or less than about 1 millisecond.

The communications manager 101 may be configured to receive the ranging signals and identify the ranging signals based at least in part on the configuration. The communications manager 101 may determine a distance between a transmitting device and a receiving device based at least in part on the ranging signals. For example, the communications manager 101 may determine a transmission time for each of the ranging signals, determine an arrival time for each of the ranging signals, and determine the distance between the transmitting device and the receiving device based at least in part on the difference between the transmission times and the arrival times.

The communications manager 101 may also update positioning information or operate a motor vehicle based at least in part on the distance between the transmitting device and the receiving device.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten 1ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
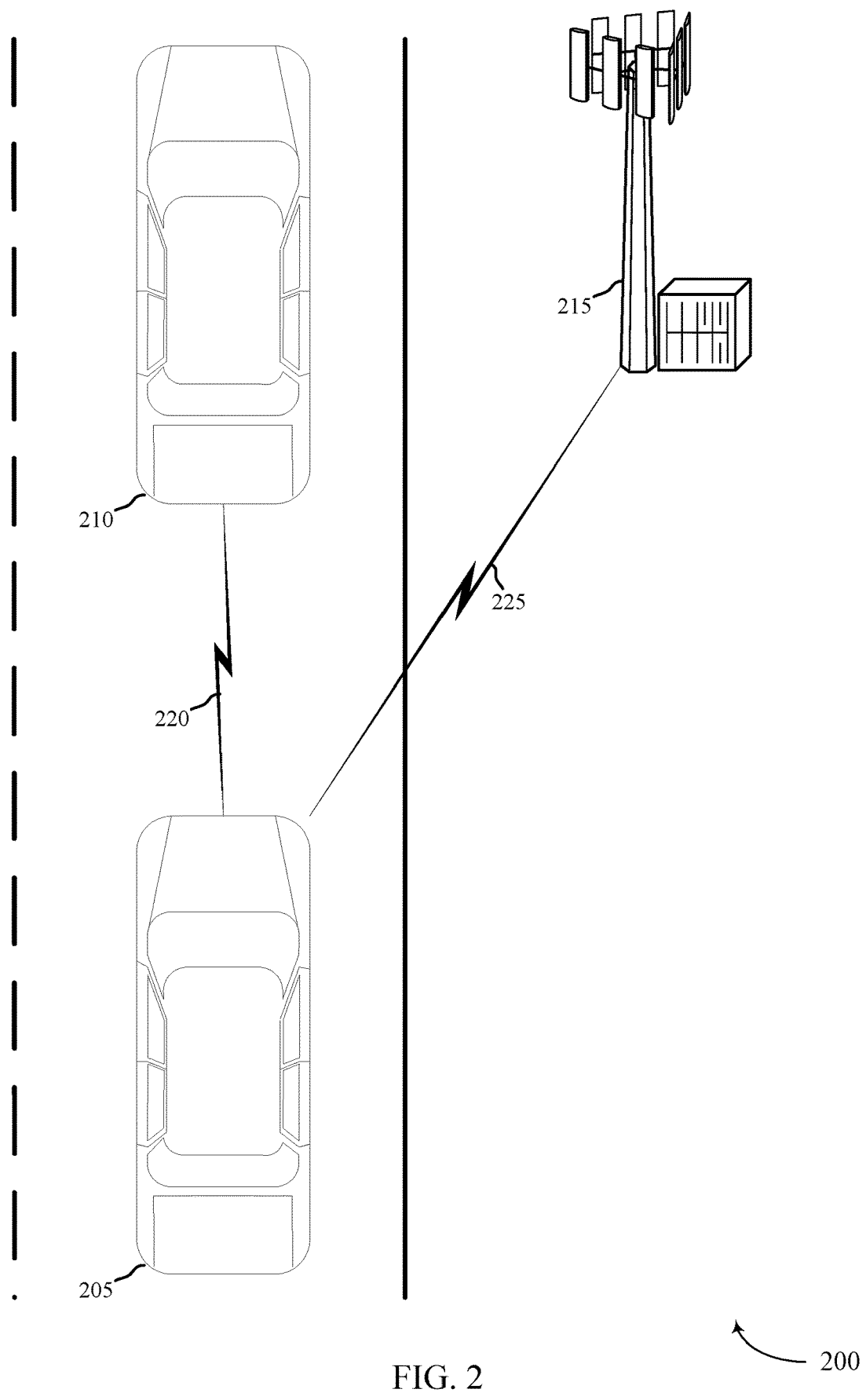
FIG. 2 illustrates an example of a wireless communication system that supports configuring multi-channel transmission for ranging accuracy in accordance with one or more aspects of the present disclosure.

FIG. 2 illustrates an example of a wireless communications system 200 that supports configuring multi-channel transmission for ranging accuracy in accordance with one or more aspects of the present disclosure. In some examples, wireless communications system 200 may implement aspects of wireless communications system 100.

The wireless communications system 200 may include a first motor vehicle 205, a second motor vehicle 210, and a RSU 215. The first motor vehicle 205 may communicate with the second motor vehicle 210 over a vehicle-to-vehicle communication link 220, and may communicate with the RSU over a vehicle-to-RSU communication link 225. Vehicle-to-vehicle communication link 220 and vehicle-to-RSU communication link 225 may be examples of aspects of communication links 125 described with reference to FIG. 1.

The first motor vehicle 205 and second motor vehicle 210 may be examples of aspects of a UE 115 as described with reference to FIG. 1. In some examples, the first motor vehicle 205 and/or second motor vehicle 210 may be an autonomous motor vehicle. The RSU 215 may be an example of aspects of a UE 115 or a base station 105 as described with reference to FIG. 1. Each of the first motor vehicle 205, the second motor vehicle 210, and the RSU 215 may be capable of transmitting or receiving ranging signals to support configuring multi-channel transmission for ranging accuracy in accordance with various aspects of the present disclosure.

In some examples, the first motor vehicle 205 may determine a distance between the first motor vehicle 205 and the RSU 215. The first motor vehicle 205 may update positioning information, such as a Global Positioning System (GPS) location, based at least in part on the determined distance.

In some examples, the RSU 215 may transmit ranging signals over the vehicle-to-RSU communication link 225 to allow the first motor vehicle 205 to determine the distance between the first motor vehicle 205 and the RSU 215. The ranging signals may be transmitted over a plurality of different channels. In some examples, the RSU 215 may transmit the ranging signals in response to a request from the first motor vehicle 205. In some other examples, the RSU 215 may transmit the ranging signals when the RSU 215 determines that the first motor vehicle 205 has entered the geographic coverage area for the RSU 215.

In some examples, the RSU 215 may identify a configuration for transmitting the ranging signals over a plurality of channels in a vehicle-based communication system. The configuration may identify the channels to be used to transmit the ranging signals and the timing for the transmission of the ranging signals. The configuration may also include a transmitter identifier corresponding to the RSU 215 and a data sequence for each of the ranging signals. In some cases, the configuration may be generated by the RSU 215. In other examples, the configuration may be a set of default parameters provided to the RSU 215 and known to the first motor vehicle 205.

The RSU 215 may transmit the configuration to the first motor vehicle 205 over the vehicle-to-RSU communication link 225. In some examples, the RSU 215 may transmit the configuration in a broadcast message. In other examples, the RSU 215 may transmit the configuration in a dedicated message addressed to the first motor vehicle 205.

The RSU 215 may then transmit the ranging signals to the first motor vehicle 205 in accordance with the configuration. In some examples, the RSU 215 may transmit each of the ranging signals simultaneously on a different channel. In some other examples, the RSU 215 may transmit each of the ranging signals during a different time period within a transmission interval. The transmission may be less than about 2 milliseconds or less than about 1 millisecond. In such examples, the configuration may also include offset information, e.g., a phase offset for each of the ranging signals or a time offset for each of the ranging signals.

The first motor vehicle 205 may receive each of the ranging signals from the RSU 215. In some examples, the first motor vehicle 205 may identify the ranging signals based at least in part on the configuration received from the RSU 215. For example, the first motor vehicle 205 may identify a received signal as a ranging signal from RSU 215 when the signal matches the information for a ranging signal identified in the configuration, e.g., when the signal includes the transmitter identifier corresponding to RSU 215 and satisfies the combination of time, channel, and data sequence defined in the configuration.

The first motor vehicle 205 may determine an arrival time for each of the plurality of ranging signals and compare the arrival time to a transmission time. In some examples, the first motor vehicle 205 may determine the channel frequency response (CFR) over the channel of each of the plurality of ranging signals, determine a combined CFR based at least in part on the CFR for each channel, and determine the arrival time based at least in part on the combined CFR. The first motor vehicle 205 may determine the transmission time based upon, e.g., a time schedule in the configuration, a time offset in the configuration, the ranging signal, or a combination thereof. The first motor vehicle 205 may calculate a distance between the RSU 215 and the first motor vehicle 205 based at least in part on the transmission time and arrival time of each of the ranging signals.

The first motor vehicle 205 may update positioning information based at least in part on the determined distance. For example, the first motor vehicle 205 may update a GPS location based at least in part on the distance and a known location of the RSU 215. In some examples, the location of the RSU 215 may be included in the configuration or may be retrieved (e.g., from a memory) based at least in part on the transmitter identifier.

In some other examples, the first motor vehicle 205 may determine a distance between the first motor vehicle 205 and a second motor vehicle 210, which may be an example of aspects of UE 115 described with reference to FIG. 1. The first motor vehicle 205 may operate the first motor vehicle 205 based on the determined distance.

In some examples, the second motor vehicle 210 may transmit ranging signals over the vehicle-to-vehicle communication link 220 to allow the first motor vehicle 205 to determine the distance between the first motor vehicle 205 and the second motor vehicle 210. The ranging signals may be transmitted over a plurality of different channels.

In some examples, the second motor vehicle 210 may identify a configuration for transmitting the ranging signals over a plurality of channels in a vehicle-based communication system. The configuration may identify the channels to be used to transmit the ranging signals and the timing for the transmission of the ranging signals. The configuration may also include a transmitter identifier corresponding to the second motor vehicle 210 and a data sequence for each of the ranging signals. In some cases, the configuration may be generated by the second motor vehicle 210. In other examples, the configuration may be a set of default parameters provided to the second motor vehicle 210 and known to the first motor vehicle 205.

The second motor vehicle 210 may transmit the configuration to the first motor vehicle 205 over the vehicle-to-vehicle communication link 220. In some examples, the second motor vehicle 210 may transmit the configuration in a broadcast message. In other examples, the second motor vehicle 210 may transmit the configuration in a dedicated message addressed to the first motor vehicle 205. When the configuration includes default parameters known to the first motor vehicle 205, the second motor vehicle 210 may not transmit the configuration to the first motor vehicle 205.

The second motor vehicle 210 may transmit the ranging signals to the first motor vehicle 205 based at least in part on the configuration. In some examples, the second motor vehicle 210 may transmit each of the ranging signals simultaneously on a different channel. In some other examples, the second motor vehicle 210 may transmit each of the ranging signals during a different time period within a transmission interval. The transmission may be less than about 2 milliseconds or less than about 1 millisecond. In such examples, the configuration may also include offset information, e.g., a phase offset for each of the ranging signals or a time offset for each of the ranging signals.

The first motor vehicle 205 may receive each of the ranging signals from the second motor vehicle 210. In some examples, the first motor vehicle 205 may identify the ranging signals based at least in part on the configuration received from the second motor vehicle 210. For example, the first motor vehicle 205 may identify a received signal as a ranging signal from second motor vehicle 210 when the signal includes the transmitter identifier corresponding to second motor vehicle 210 and satisfies the combination of time, channel, and data sequence defined in the configuration.

The first motor vehicle 205 may determine an arrival time for each of the plurality of ranging signals and compare the arrival time to a transmission time. In some examples, the first motor vehicle 205 may determine the CFR over the channel of each of the plurality of ranging signals, determine a combined CFR based at least in part on the CFR for each channel, and determine the arrival time based at least in part on the combined CFR. The first motor vehicle 205 may determine the transmission time based upon, e.g., the time schedule in the configuration, a time offset in the configuration, the ranging signal, or a combination thereof. The first motor vehicle 205 may calculate a distance between the second motor vehicle 210 and the first motor vehicle 205 based at least in part on the transmission time and arrival time of each of the ranging signals.

The first motor vehicle 205 may operate the first motor vehicle 205 based at least in part on the determined distance. For example, the first motor vehicle 205 may be an autonomous vehicle that navigates based on the location of other cars in the area, as well as other factors including the speed and direction of those cars, which information may also be transmitted from the second motor vehicle 210 to the first motor vehicle 205 over the vehicle-to-vehicle communication link 220.

Figure 3:
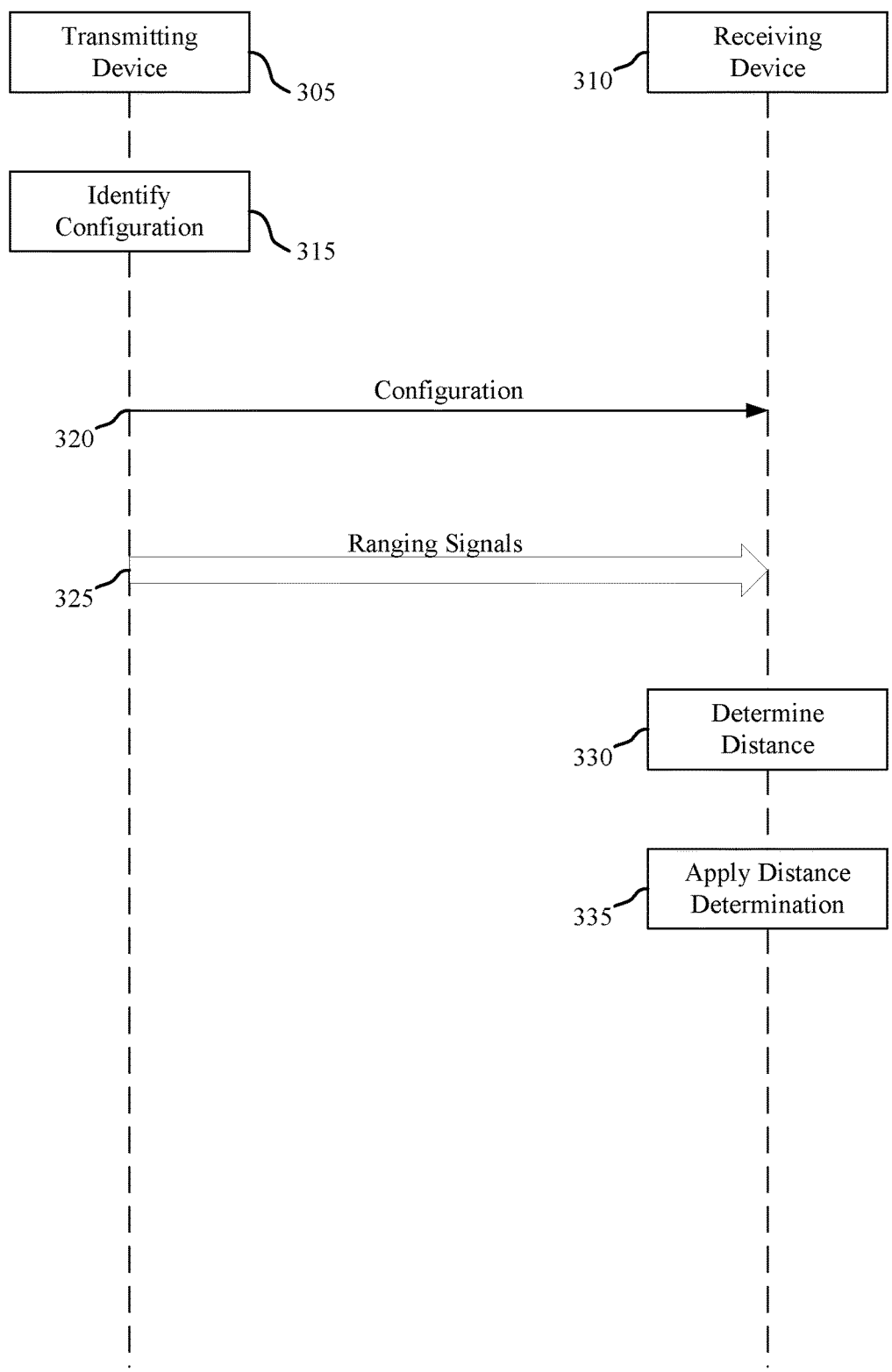
FIG. 3 illustrates an example of a communication flow in a wireless communication system that supports configuring multi-channel transmission for ranging accuracy in accordance with one or more aspects of the present disclosure.

FIG. 3 illustrates an example of a communication flow 300 in a wireless communication system that supports configuring multi-channel transmission for ranging accuracy in accordance with one or more aspects of the present disclosure. In some examples, communication flow 300 may implement aspects of wireless communication system 100.

Communication flow 300 illustrates communications between a transmitting device 305 and a receiving device 310. The transmitting device 305 and receiving device 310 may be examples of aspects of a motor vehicle such as first motor vehicle 205 or second motor vehicle 210 as described with reference to FIG. 2. In some examples, the transmitting device 305 or receiving device 310 may be examples of aspects of a RSU such as RSU 215.

The transmitting device 305 (e.g., a motor vehicle) may identify a configuration for transmitting ranging signals in a vehicle-based communication system at 315. In some examples, the transmitting device 305 may identify the configuration in response to receiving a request to perform ranging from the receiving device 310. In some other examples, the transmitting device 305 may identify the configuration in response to determining that the receiving device 310 has entered the geographic coverage area of the transmitting device 305.

The configuration may include an identification of a plurality of ranging signals that the transmitting device 305 will transmit over a wireless medium. The configuration may also identify, for each of the plurality of ranging signals, (1) a channel over which the ranging signal is to be transmitted, (2) a data sequence to be included in the ranging signal, and (3) a time schedule for transmitting the ranging signal. The configuration may identify the channel by identifying the frequency band for the channel or by including a channel identifier known to both the transmitting device 305 and the receiving device 310. The configuration may also include an identifier corresponding to the transmitting device 305.

The configuration may also include offset information for one or more of the ranging signals. For example, when the configuration indicates that at least some of the ranging signals are to be transmitted during a later time period than others, the configuration may include a time offset or a phase offset for the later-scheduled ranging signals.

In some examples, the configuration may be generated by the transmitting device 305. In some other examples, the configuration may be a set of default parameters provided to the transmitting device 305 and known to the receiving device 310.

The transmitting device 305 may transmit the configuration 320 to the receiving device 310. The transmitting device 305 may transmit the configuration 320 to the receiving device 310 in a broadcast message or in a dedicated message addressed to receiving device 310. In some other examples, the transmitting device 305 may not transmit the configuration 320 to the receiving device 310 when the configuration includes default parameters known to the receiving device 310.

The transmitting device 305 may transmit the ranging signals 325 to the receiving device 310 according to the configuration. In some examples, the transmitting device 305 may transmit the ranging signals simultaneously. For example, the transmitting device 305 may transmit each of the ranging signals on a different channel at the same time using carrier aggregation techniques. In some other examples, the transmitting device 305 may transmit the ranging signals during a plurality of different time periods within a transmission interval. For example, the transmitting device 305 may transmit each of the ranging signals during a different time period during the transmission interval, or may transmit groups of ranging signals during different time periods during the transmission interval.

The receiving device 310 may receive the ranging signals 325 from the transmitting device 305. In some examples, the receiving device 310 may receive the ranging signals 325 along with numerous other signals from a plurality of network devices (e.g., UEs and/or base stations). The receiving device 310 may identify the ranging signals 325 based at least in part on the configuration 320. In some examples, the receiving device 310 may identify a signal as a ranging signal when the signal is received from the transmitting device 305 (e.g., when the signal includes the transmitter identifier included in the configuration 320) and includes a ranging signal data sequence (e.g., one of the data sequences identified in the configuration 320). In other examples, the receiving device 310 may identify a signal as a ranging signal when it matches a combination of transmitter identifier, channel, data sequence, and time schedule identified in the configuration 320.

The receiving device 310 may determine a distance between the transmitting device 305 and the receiving device 310 at 330. Determining the distance between the transmitting device 305 and the receiving device 310 may include determining a transmission time for each of the plurality of ranging signals. The transmission time (i.e., the time at which the ranging signal was sent by the transmitting device 305) may be provided to the receiving device 310 in the configuration 320 or the ranging signals 325. In some examples, the transmission time for a ranging signal may include determining a transmission time for a later-arriving ranging signal based at least in part on the transmission time for an earlier-arriving ranging signal and offset information (e.g., a time offset or a phase offset).

Determining the distance between the transmitting device 305 and the receiving device 310 may also include determining an arrival time for each of the plurality of ranging signals. In some examples, e.g. when the ranging signals are transmitting simultaneously, the receiving device 310 may determine a CFR for each of the plurality of channels that carries a ranging signal. The receiving device 310 may then determine a combined CFR based at least in part on the CFR for each of the plurality of channels. The receiving device 310 may determine the arrival time based at least in part on the combined CFR.

Determining the distance between the transmitting device 305 and the receiving device 310 may also include determining a difference between the transmission time and the arrival time. The difference represents the amount of time to propagate signals between the transmitting device 305 and the receiving device 310. The receiving device 310 may determine the distance between the transmitting device 305 and the receiving device 310 based on the difference and the speed of transmission.

The receiving device 310 may then apply the distance determination at 335. The application of the distance determination may vary based on the identity of the transmitting device 305 and the receiving device 310. For example, when the transmitting device 305 is a RSU and the receiving device 310 is a motor vehicle, the receiving device 310 may use the distance to update positioning information. For example, the receiving device 310 may store a GPS location in a memory device. The GPS location of the transmitting device 305 (the RSU) may be fixed and therefore may be used as a reference point for updating the GPS location of the receiving device 310. The receiving device 310 may determine the GPS location of the transmitting device 305 (the RSU) by receiving the GPS location with the configuration 320 or by looking up the GPS location of the transmitting device 305 (the RSU) in a database.

In some other examples, when the transmitting device 305 is a first motor vehicle and the receiving device 310 is a second motor vehicle (e.g., an autonomous vehicle), the receiving device 310 may use the distance to operate the second motor vehicle. For example, the receiving device 310 may use the distance, along with information about the speed and direction of the first motor vehicle, to navigate the second motor vehicle and avoid collisions. In such examples, the communication flow 300 may be repeated multiple times per second while the second motor vehicle is within the geographic coverage range of the first motor vehicle.

Figure 4:
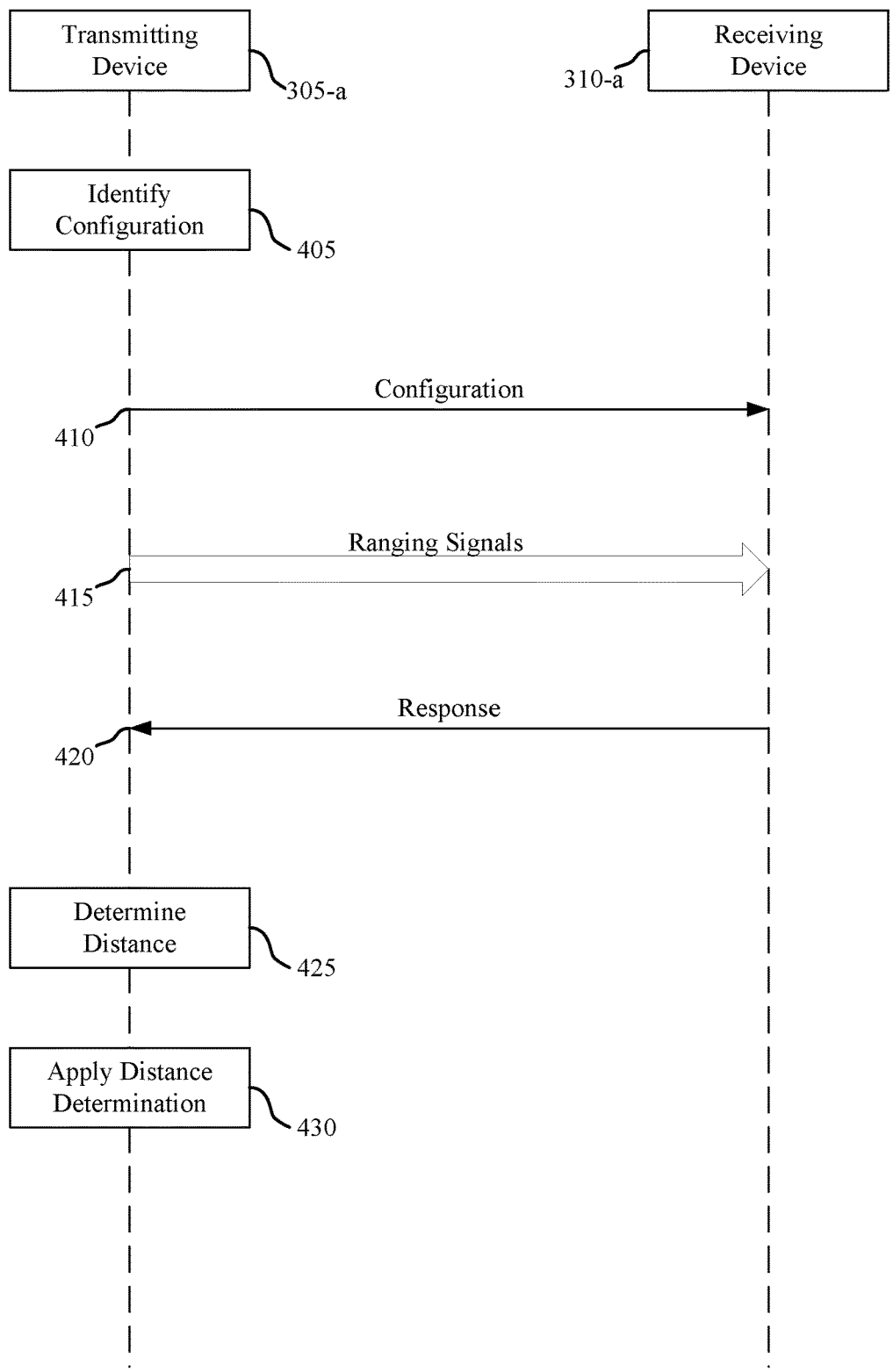
FIG. 4 illustrates an example of a communication flow in a wireless communication system that supports configuring multi-channel transmission for ranging accuracy in accordance with one or more aspects of the present disclosure.

FIG. 4 illustrates an example of a communication flow 400 in a wireless communication system that supports configuring multi-channel transmission for ranging accuracy in accordance with one or more aspects of the present disclosure. In some examples, communication flow 400 may implement aspects of wireless communications system 100. The transmitting device 305-a and receiving device 310-a may be examples of aspects of the transmitting device 305 and receiving device 310 described with reference to FIG. 3.

The transmitting device 305-a may identify a configuration at 405, transmit the configuration 410 to the receiving device 310-a, and transmit the ranging signals 415 to the receiving device 310-a as described with respect to FIG. 3. The receiving device 310-a may receive the ranging signals 325 and identify the ranging signals as described with respect to FIG. 3.

The receiving device 310-a may transmit a response 420 to the transmitting device 305-a. In some examples (e.g., where the receiving device is a RSU and the transmitting device is a motor vehicle, or where the receiving device 310-a does not have information about the transmission times for the ranging signals), the response may include an arrival time for each of the plurality of ranging signals, an average arrival time for each of the plurality of signals, or an arrival time based on a combined CFR for the plurality of channels. The arrival times or combined CFR may be calculated as described with reference to FIG. 3. In some other examples (e.g., where both the transmitting device 305-a and the receiving device 310-a are motor vehicles that may utilize the distance information), the response may include the difference between the transmission time and the arrival time for each of the plurality of ranging signals, an average of the difference between the transmission time and the arrival time for each of the plurality of ranging signals, or a distance between the transmitting device 305-a and the receiving device 310-a. The differences or distance may be calculated as described with reference to FIG. 3. In some examples, the receiving device 310-a (e.g., a motor vehicle) may also utilize this information, e.g., to operate a motor vehicle as described with reference to FIG. 3.

The transmitting device 305-a may determine the distance between the transmitting device 305-a and the receiving device 310-a at 430. The transmitting device 305-a may determine the distance using the methods described with reference to FIG. 3. The transmitting device 305-a may then apply the distance determination at 430. In some examples, e.g., where the transmitting device 305-a is a motor vehicle and the receiving device 310-a is a RSU, the transmitting device 305-a may update positioning information as described with reference to FIG. 3. In some other examples, e.g., where the transmitting device 305-a is a first motor vehicle and the receiving device 310-a is a second motor vehicle, the transmitting device 305-a may operate the first motor vehicle as described with reference to FIG. 3.

Figure 5:
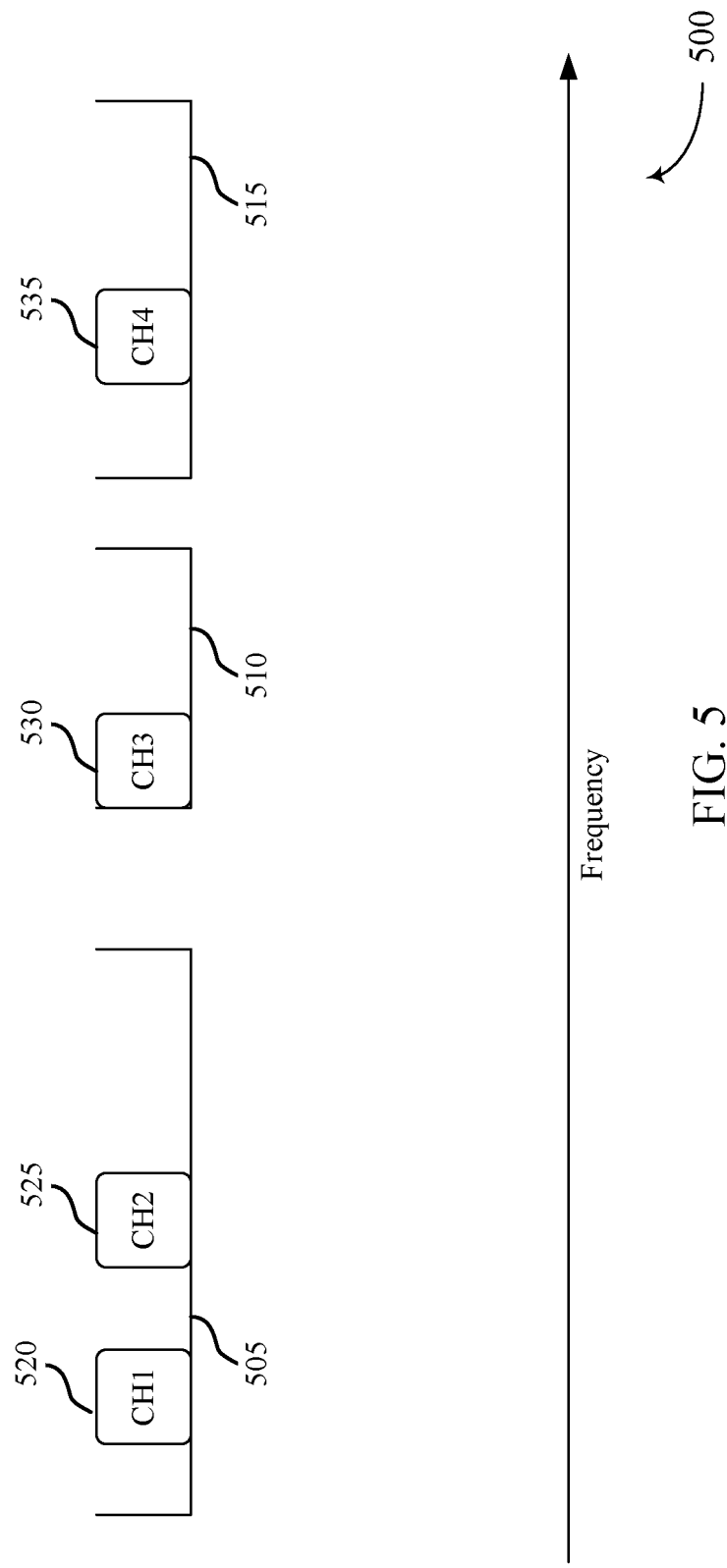
FIG. 5 illustrates an example of the simultaneous transmission of ranging signals in a wireless communication system that supports configuring multi-channel transmission for ranging accuracy in accordance with one or more aspects of the present disclosure.

FIG. 5 illustrates an example of the simultaneous transmission of ranging signals 500 in a wireless communication system that supports configuring multi-channel transmission for ranging accuracy in accordance with one or more aspects of the present disclosure. In some examples, the simultaneous transmission of ranging signals 500 may implement aspects of wireless communications system 100.

The simultaneous transmission of ranging signals 500 represents signals transmitted from a transmitting device to a receiving device. The transmitting device and the receiving device may be examples of aspects of transmitting device 305 and receiving device 310 described with reference to FIG. 3.

The transmitting device may have access to three frequency bands during a particular transmission opportunity: a first frequency band 505, a second frequency band 510, and a third frequency band 515. Each of the frequency bands may be divided into a plurality of channels. Each of the channels may have a bandwidth of 10 MHz. For example, the first frequency band 505 may include channel CH1 520 and channel CH2 525, the second frequency band 510 may include channel CH3 530, and the third frequency band may include channel CH4 535.

The transmitting device may transmit each of a plurality of ranging signals simultaneously in a single transmission opportunity. For example, the transmitting device may transmit a ranging signal on each of channel CH1 520, channel CH2 525, channel CH3 530, and channel CH4 535. In such an example, the total bandwidth for the ranging signals is 40 MHz, as opposed to only 10 MHz if only a single channel is used. The larger bandwidth may allow the distance between the transmitting device and the receiving device to be more accurately calculated.

Figure 6:
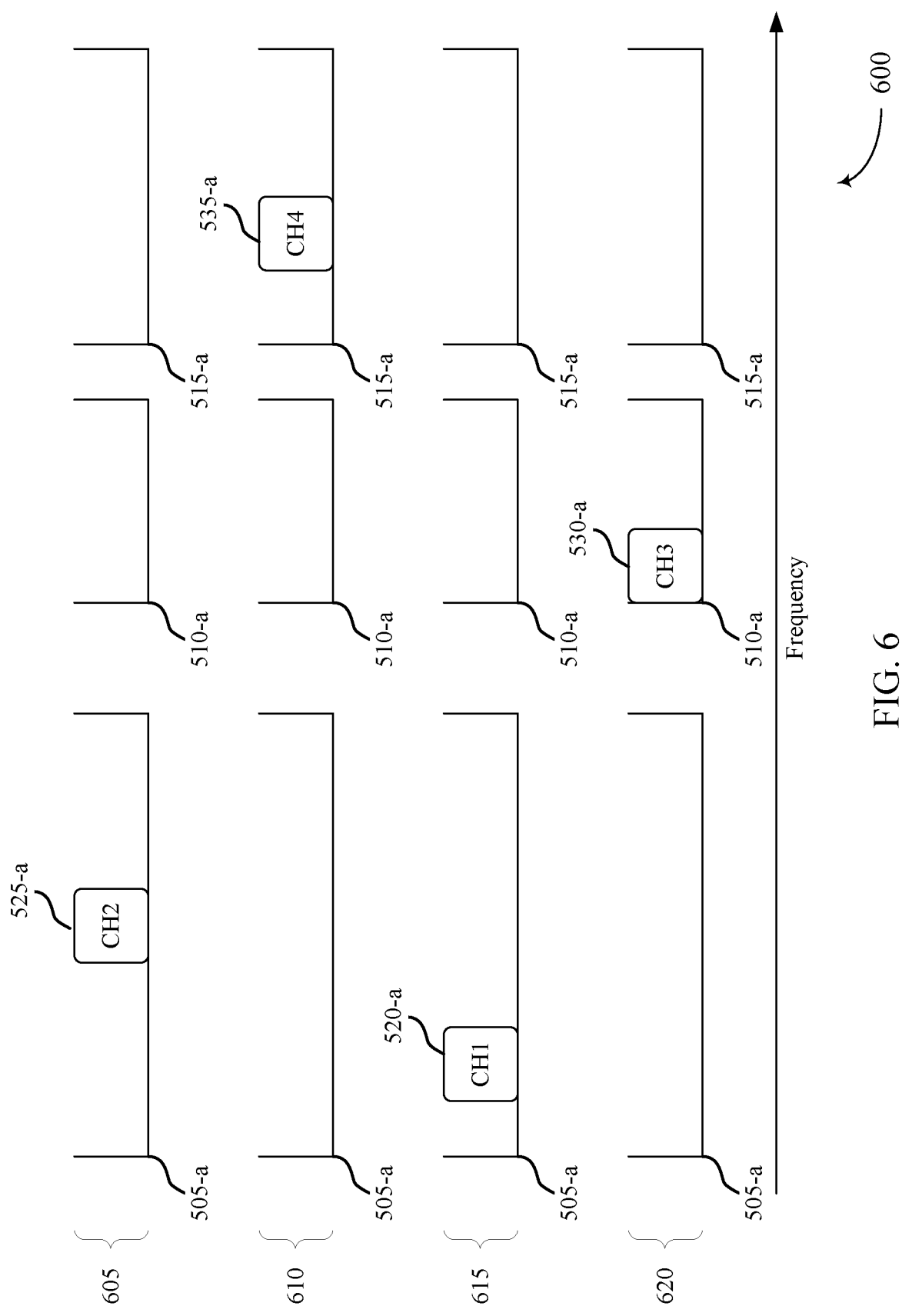
FIG. 6 illustrates an example of the transmission of ranging signals during separate time periods within a transmission interval in a wireless communication system that supports configuring multi-channel transmission for ranging accuracy in accordance with one or more aspects of the present disclosure.

FIG. 6 illustrates an example of the transmission of ranging signals during separate time periods within a transmission interval 600 in a wireless communication system that supports configuring multi-channel transmission for ranging accuracy in accordance with one or more aspects of the present disclosure. In some examples, the transmission of ranging signals during separate time periods within a transmission interval 600 may implement aspects of wireless communications system 100.

The transmission of ranging signals during separate time periods within a transmission interval 600 represents signals transmitted from a transmitting device to a receiving device. The transmitting device and the receiving device may be examples of aspects of transmitting device 305 and receiving device 310 described with reference to FIG. 3.

The transmitting device may transmit each of a plurality of ranging signals during a different transmission opportunity with the transmission interval. The transmission interval may be less than about 2 milliseconds, or less than about 1 millisecond, such that the relative locations of the transmitting device and the receiving device are approximately the same throughout the transmission interval.

The transmitting device may have access to three frequency bands during each transmission opportunity: a first frequency band 505-*a*, a second frequency band 510-*a*, and a third frequency band 515-*a*. However, instead of transmitting each ranging signal during one transmission opportunity, the transmitting device may transmit the ranging signals across a plurality of transmission opportunities. For example, the transmitting device may transmit one or more ranging signals during a first transmission opportunity 605, a second transmission opportunity 610, a third transmission opportunity 615, and a fourth transmission opportunity 620.

For example, the transmitting device may transmit a first ranging signal on channel CH2 525-*a* during the first transmission opportunity 605, a second ranging signal on channel CH4 535-*a* during the second transmission opportunity 610, a third ranging signal on channel CH1 520-*a* during the third transmission opportunity 615, and a fourth ranging signal on channel CH3 530-*a* during the fourth transmission opportunity 620. Because the ranging signals are all transmitted during a transmission interval of about 1 or 2 milliseconds, the distance between the transmitting device and the receiving device will remain about the same. The increased bandwidth (40 MHz for four ranging signals) may allow the distance between the transmitting device and the receiving device to be more accurately calculated.

Figure 7:
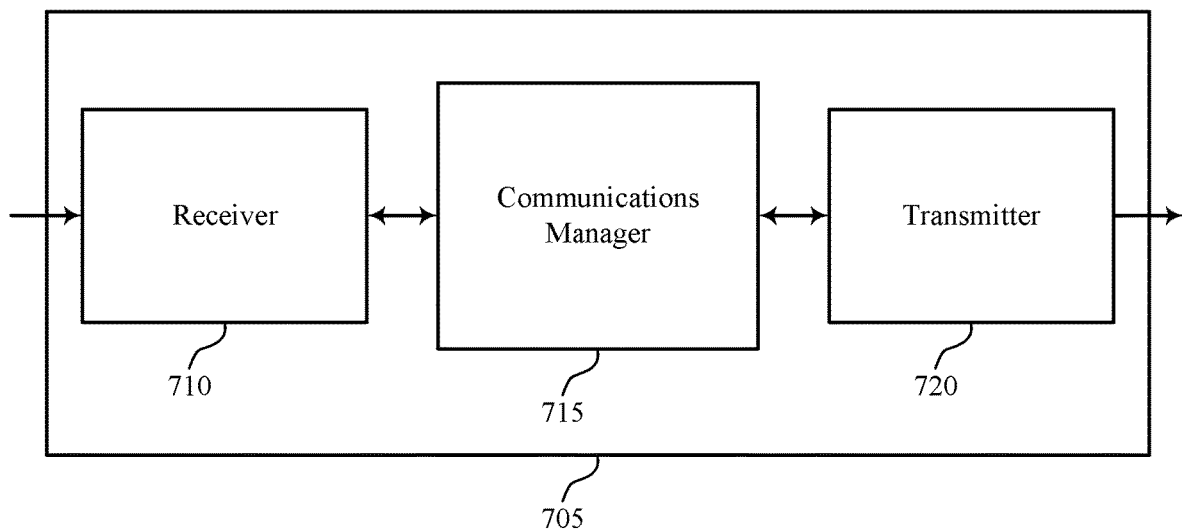
FIGS. 7 through 9 show block diagrams of a device that supports configuring multi-channel transmission for ranging accuracy in accordance with one or more aspects of the present disclosure.

FIG. 7 shows a block diagram 700 of a wireless device 705 that supports configuring multi-channel transmission for ranging accuracy in accordance with one or more aspects of the present disclosure. Wireless device 705 may be an example of aspects of a first motor vehicle 205, a second motor vehicle 210, or a RSU 215 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to configuring multi-channel transmission for ranging accuracy, etc.). Information may be passed on to other components of the device. The receiver 710 may be an example of aspects of the transceiver 1035 described with reference to FIG. 10. The receiver 710 may utilize a single antenna or a set of antennas.

Receiver 710 may receive, from the receiver 710, an indication of a time elapsed between transmission and receipt of the ranging signals, an indication of an arrival time of the ranging signals, or a combination thereof, receive, at a wireless device, signaling identifying a configuration for receiving ranging signals in a vehicle-based communication system, the configuration identifying a set of channels to be used for the ranging signals and timing for the ranging signals, receive, based on the configuration, the ranging signals on the set of channels according to the configuration, receive the ranging signals simultaneously on the set of channels based on the configuration, receive the ranging signals on the set of channels during a reception interval based on the configuration, each of the ranging signals being received during a different time period during the reception interval, and receive offset information, the offset information including phase offset information for one or more of the ranging signals, time offset information for one or more of the ranging signals, or a combination thereof. In some cases, the offset information is received with the configuration.

Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify, by a transmitter, a configuration for transmitting ranging signals in a vehicle-based communication system, the configuration identifying a set of channels to be used for the ranging signals and timing for the ranging signals.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit the configuration to a receiver, transmit the ranging signals simultaneously on the set of channels based on the configuration, transmit the ranging signals simultaneously on the set of channels includes using carrier aggregation, transmit the ranging signals on the set of channels during a transmission interval based on the configuration, each of the ranging signals being transmitted during a different time period during the transmission interval, transmit the ranging signals on the set of channels based on the configuration, transmit each of the ranging signals on the channel identified in the configuration, transmit the data sequence on each of the set of channels, transmit the ranging signals according to the time schedule, and transmit offset information to the receiver, the offset information including phase offset information for one or more of the ranging signals, time offset information for one or more of the ranging signals, or a combination thereof. In some cases, the offset information is transmitted with the configuration. In some cases, transmitting the configuration to the receiver includes: transmitting the configuration to the receiver in a broadcast message. In some cases, transmitting the configuration to the receiver includes: transmitting the configuration to the receiver in a dedicated message addressed to the receiver.

Figure 8:
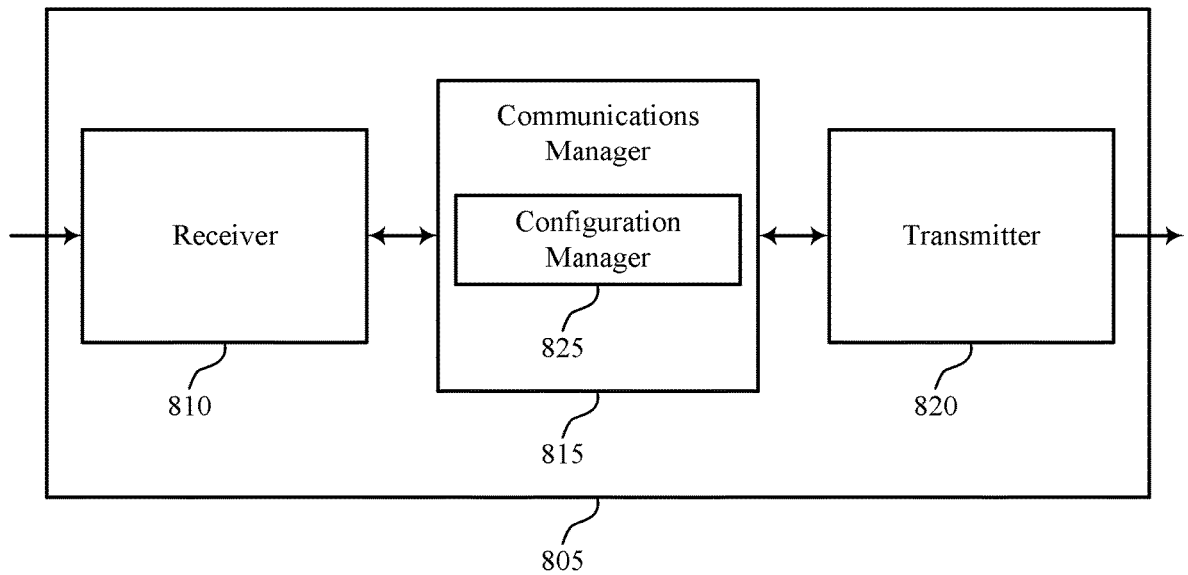

FIG. 8 shows a block diagram 800 of a wireless device 805 that supports configuring multi-channel transmission for ranging accuracy in accordance with one or more aspects of the present disclosure. Wireless device 805 may be an example of aspects of a wireless device 705 or first motor vehicle 205, second motor vehicle 210, or RSU 215, transmitting device 305, or receiving device 310 as described with reference to FIG. 2 or 3. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to configuring multi-channel transmission for ranging accuracy, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 715 described with reference to FIG. 7.

Communications manager 815 may also include configuration manager 825.

Configuration manager 825 may identify a configuration for transmitting ranging signals in a vehicle-based communication system, the configuration identifying a set of channels to be used for the ranging signals and timing for the ranging signals. In some cases, the configuration includes a transmitter identifier corresponding to the transmitter, an identification of a channel for each of the ranging signals, a data sequence for each of the ranging signals, a time schedule for the ranging signals, or a combination thereof.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
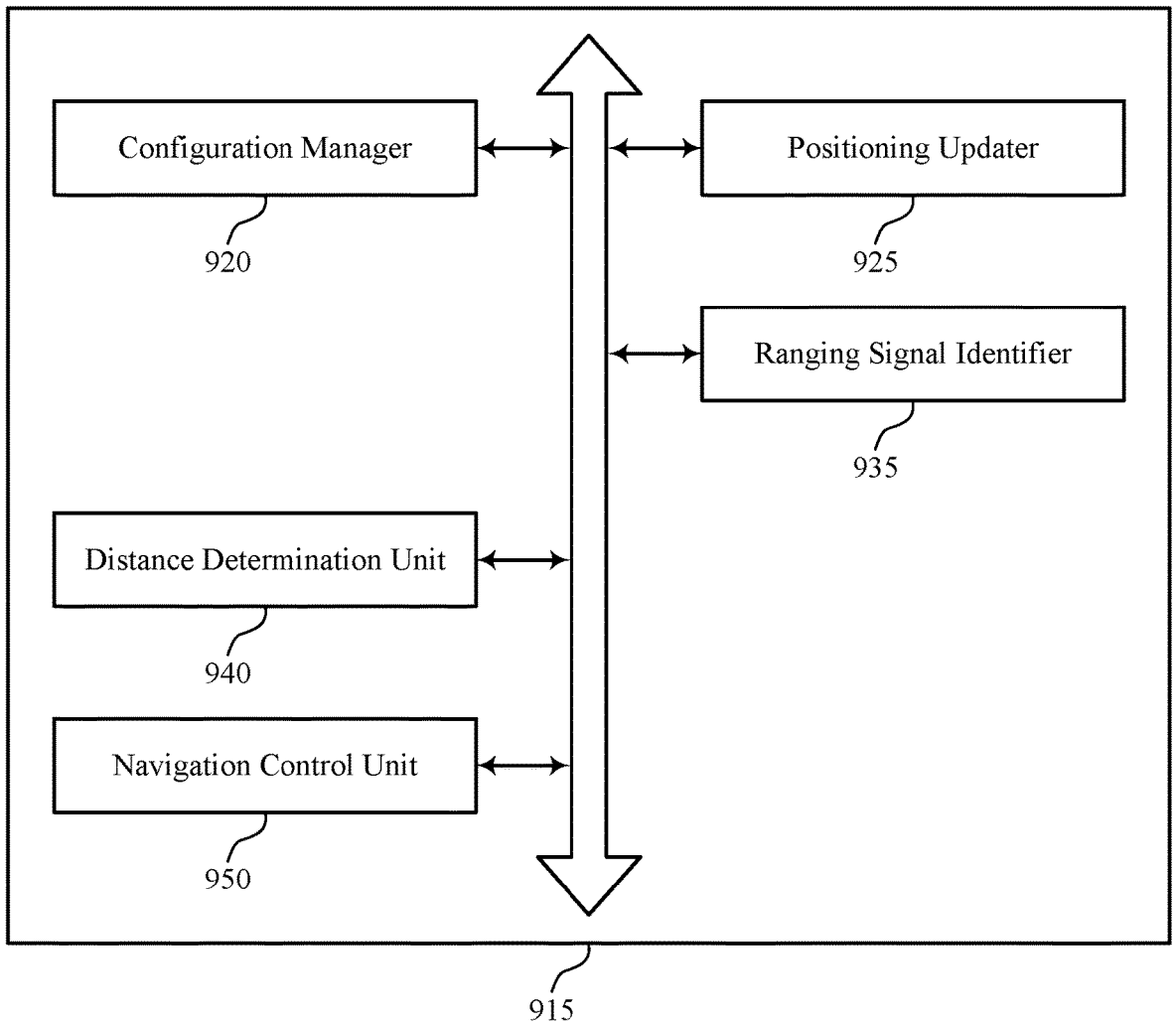

FIG. 9 shows a block diagram 900 of a communications manager 915 that supports configuring multi-channel transmission for ranging accuracy in accordance with one or more aspects of the present disclosure. The communications manager 915 may be an example of aspects of a communications manager 715 or a communications manager 815. The communications manager 915 may include configuration manager 920, positioning updater 925, ranging signal identifier 935, distance determination unit 940, and navigation control unit 950. Each of these modules may communicate, directly or indirectly, with one another (e.g., via one or more buses).

Configuration manager 920 may identify, by a transmitter, a configuration for transmitting ranging signals in a vehicle-based communication system, the configuration identifying a set of channels to be used for the ranging signals and timing for the ranging signals. In some cases, the configuration includes a transmitter identifier corresponding to the transmitter, an identification of a channel for each of the ranging signals, a data sequence for each of the ranging signals, a time schedule for the ranging signals, or a combination thereof.

Positioning updater 925 may update a positioning information based on the information received from the receiver and update positioning information based on the distance between the wireless device and the transmitter.

Ranging signal identifier 935 may identify the ranging signals based on the configuration. In some cases, the configuration includes a transmitter identifier corresponding to the transmitter, an identification of a channel for each of the ranging signals, a data sequence for each of the ranging signals, a time schedule for the ranging signals, or a combination thereof. In some cases, identifying the ranging signals includes: identifying the ranging signals based on the transmitter identifier included in the ranging signals. In some cases, identifying the ranging signals includes: identifying the ranging signals based on the channel identified in the configuration for each of the ranging signals. In some cases, identifying the ranging signals includes: identifying the ranging signals based on the data sequence included in the ranging signals. In some cases, identifying the ranging signals includes: identifying the ranging signals based on the time schedule for the ranging signals.

Distance determination unit 940 may determine, based on the ranging signals, a distance between the wireless device and a transmitter, determine an arrival time for the ranging signals, determine the distance between the wireless device and the transmitter based on a difference between the transmission time and the arrival time, determine, based on the channel frequency response for each of the set of channels, a combined channel frequency response for the set of channels, and determine the arrival time based on the combined channel frequency response. In some cases, determining the distance includes: determining a transmission time for the ranging signals based on the configuration, the ranging signals, or a combination thereof. In some cases, determining the arrival time includes: determining a channel frequency response for each of the set of channels. In some cases, the distance between the wireless device and the transmitter is determined based on the offset information.

Navigation control unit 950 may operate a first motor vehicle based on the distance between the wireless device and the transmitter.

Figure 10:
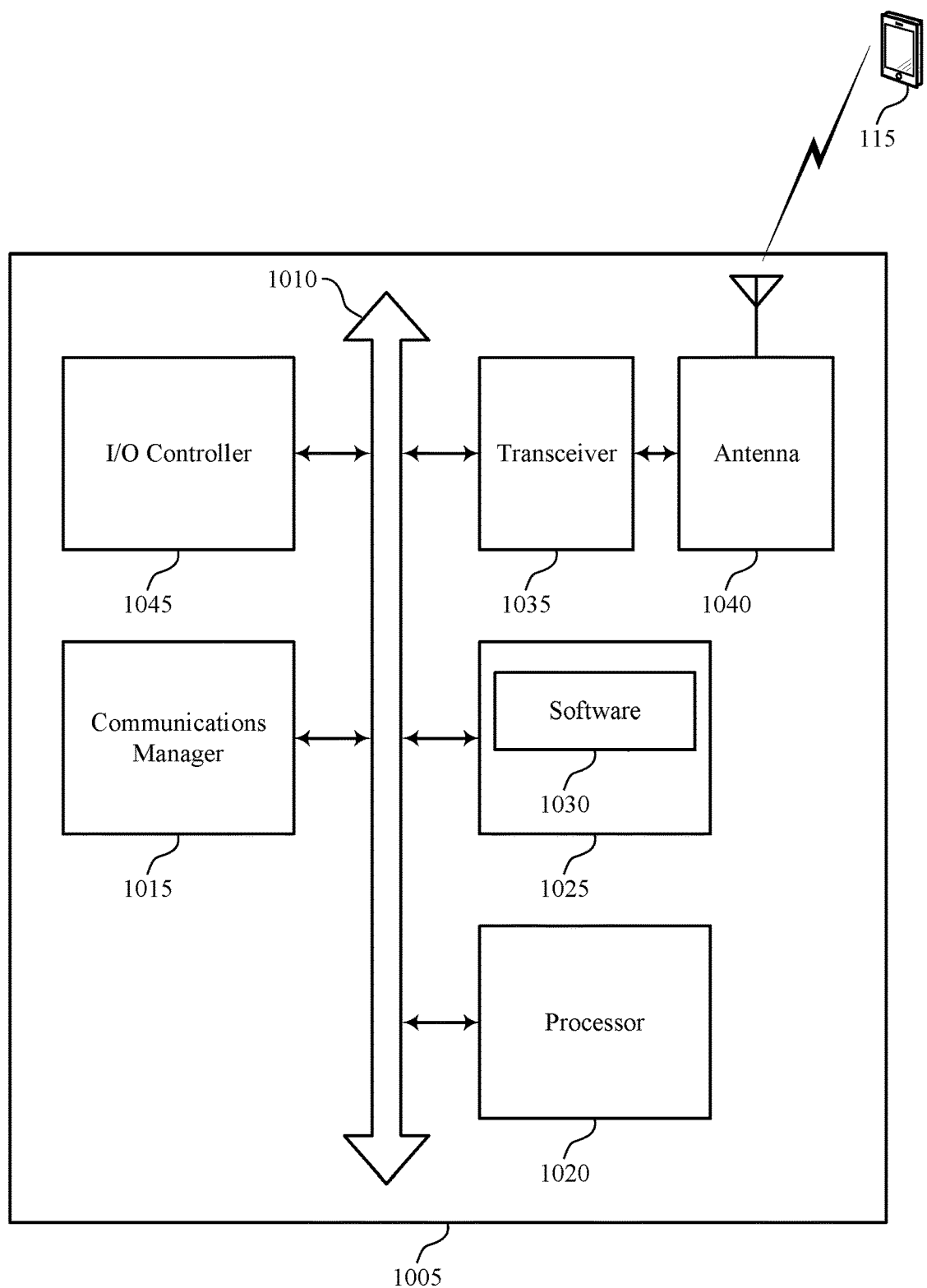
FIG. 10 illustrates a block diagram of a system including a wireless device that supports configuring multi-channel transmission for ranging accuracy in accordance with one or more aspects of the present disclosure.

FIG. 10 shows a diagram of a system 1000 including a device 1005 that supports configuring multi-channel transmission for ranging accuracy in accordance with one or more aspects of the present disclosure. Device 1005 may be an example of or include the components of wireless device 705, wireless device 805, base station 105, UE 115, first motor vehicle 205, second motor vehicle 210, RSU 215, transmitting device 305, or receiving device 310 as described above, e.g., with reference to FIGS. 1, 2, 3, 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more busses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting configuring multi-channel transmission for ranging accuracy).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support configuring multi-channel transmission for ranging accuracy. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions. I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
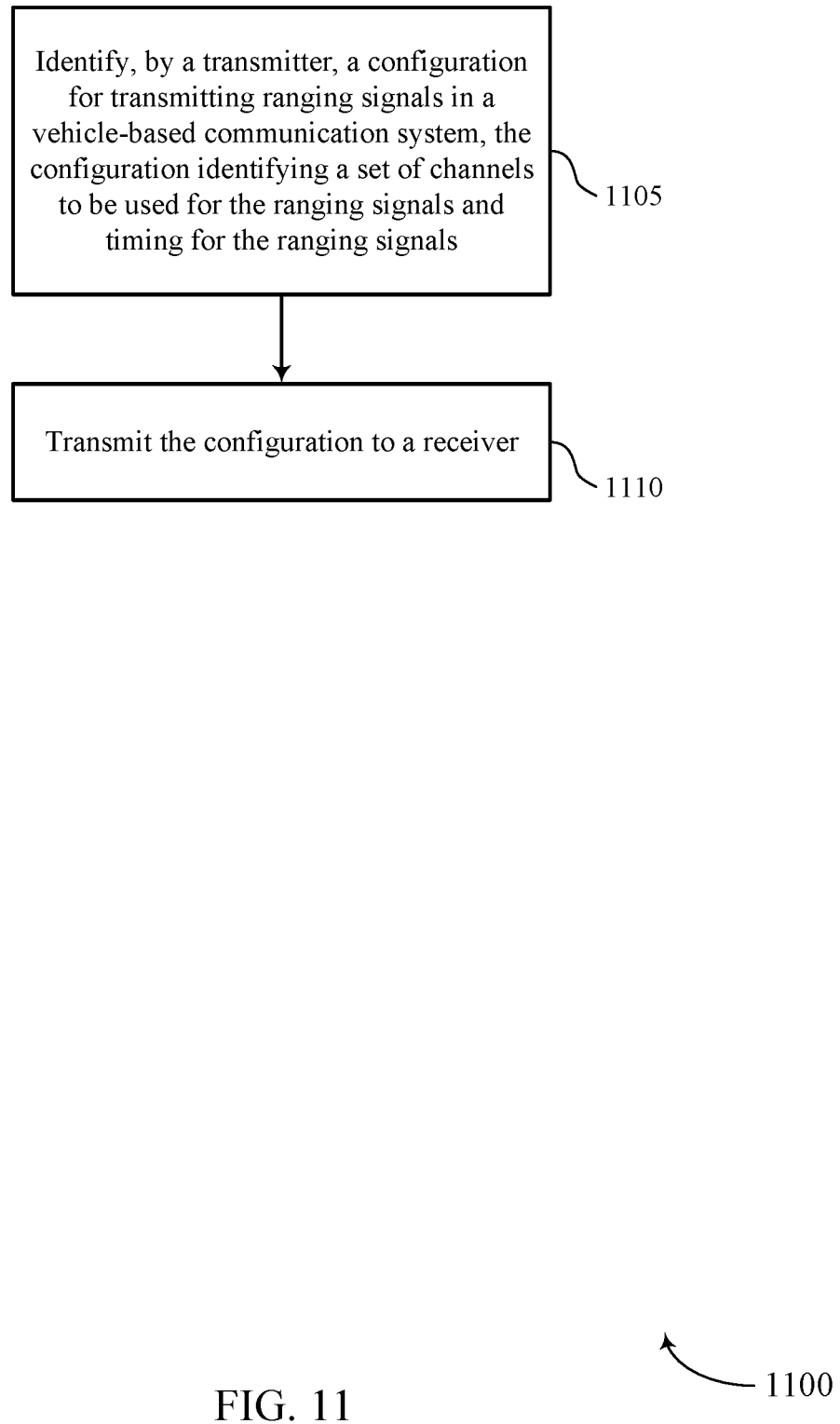
FIGS. 11 through 14 illustrate methods for configuring multi-channel transmission for ranging accuracy in accordance with one or more aspects of the present disclosure.

FIG. 11 shows a flowchart illustrating a method 1100 for configuring multi-channel transmission for ranging accuracy in accordance with one or more aspects of the present disclosure. The operations of method 1100 may be implemented by a wireless device such as first motor vehicle 205, second motor vehicle 210, RSU 215, transmitting device 305, receiving device 310 or its components as described herein. For example, the operations of method 1100 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1105 the wireless device may identify, by a transmitter, a configuration for transmitting ranging signals in a vehicle-based communication system, the configuration identifying a plurality of channels to be used for the ranging signals and timing for the ranging signals. The operations of block 1105 may be performed according to the methods described herein. In certain examples, aspects of the operations of block 1105 may be performed by a configuration manager as described with reference to FIGS. 7 through 10.

At block 1110 the wireless device may transmit the configuration to a receiver. The operations of block 1110 may be performed according to the methods described herein. In certain examples, aspects of the operations of block 1110 may be performed by a transmitter as described with reference to FIGS. 7 through 10.

Figure 12:
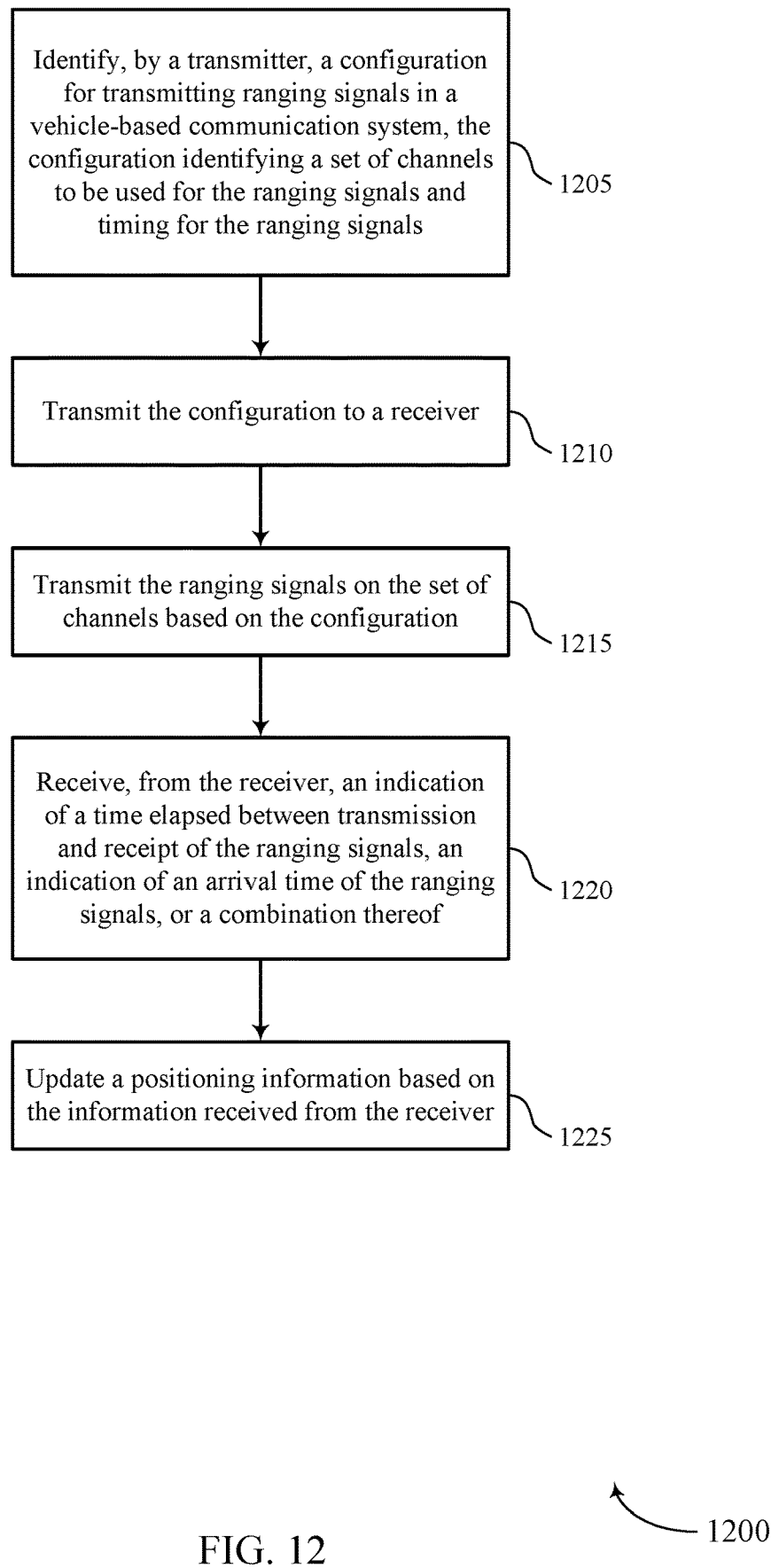

FIG. 12 shows a flowchart illustrating a method 1200 for configuring multi-channel transmission for ranging accuracy in accordance with one or more aspects of the present disclosure. The operations of method 1200 may be implemented by a wireless device such as first motor vehicle 205, second motor vehicle 210, RSU 215, transmitting device 305, receiving device 310 or its components as described herein. For example, the operations of method 1200 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1205 the wireless device may identify, by a transmitter, a configuration for transmitting ranging signals in a vehicle-based communication system, the configuration identifying a plurality of channels to be used for the ranging signals and timing for the ranging signals. The operations of block 1205 may be performed according to the methods described herein. In certain examples, aspects of the operations of block 1205 may be performed by a configuration manager as described with reference to FIGS. 7 through 10.

At block 1210 the wireless device may transmit the configuration to a receiver. The operations of block 1210 may be performed according to the methods described herein. In certain examples, aspects of the operations of block 1210 may be performed by a transmitter as described with reference to FIGS. 7 through 10.

At block 1215 the wireless device may transmit the ranging signals on the plurality of channels based at least in part on the configuration. The operations of block 1215 may be performed according to the methods described herein. In certain examples, aspects of the operations of block 1215 may be performed by a transmitter as described with reference to FIGS. 7 through 10.

At block 1220 the wireless device may receive, from the receiver, an indication of a time elapsed between transmission and receipt of the ranging signals, an indication of an arrival time of the ranging signals, or a combination thereof. The operations of block 1220 may be performed according to the methods described herein. In certain examples, aspects of the operations of block 1220 may be performed by a receiver as described with reference to FIGS. 7 through 10.

At block 1225 the wireless device may update a positioning information based at least in part on the information received from the receiver. The operations of block 1225 may be performed according to the methods described herein. In certain examples, aspects of the operations of block 1225 may be performed by a positioning updater as described with reference to FIGS. 7 through 10.

Figure 13:
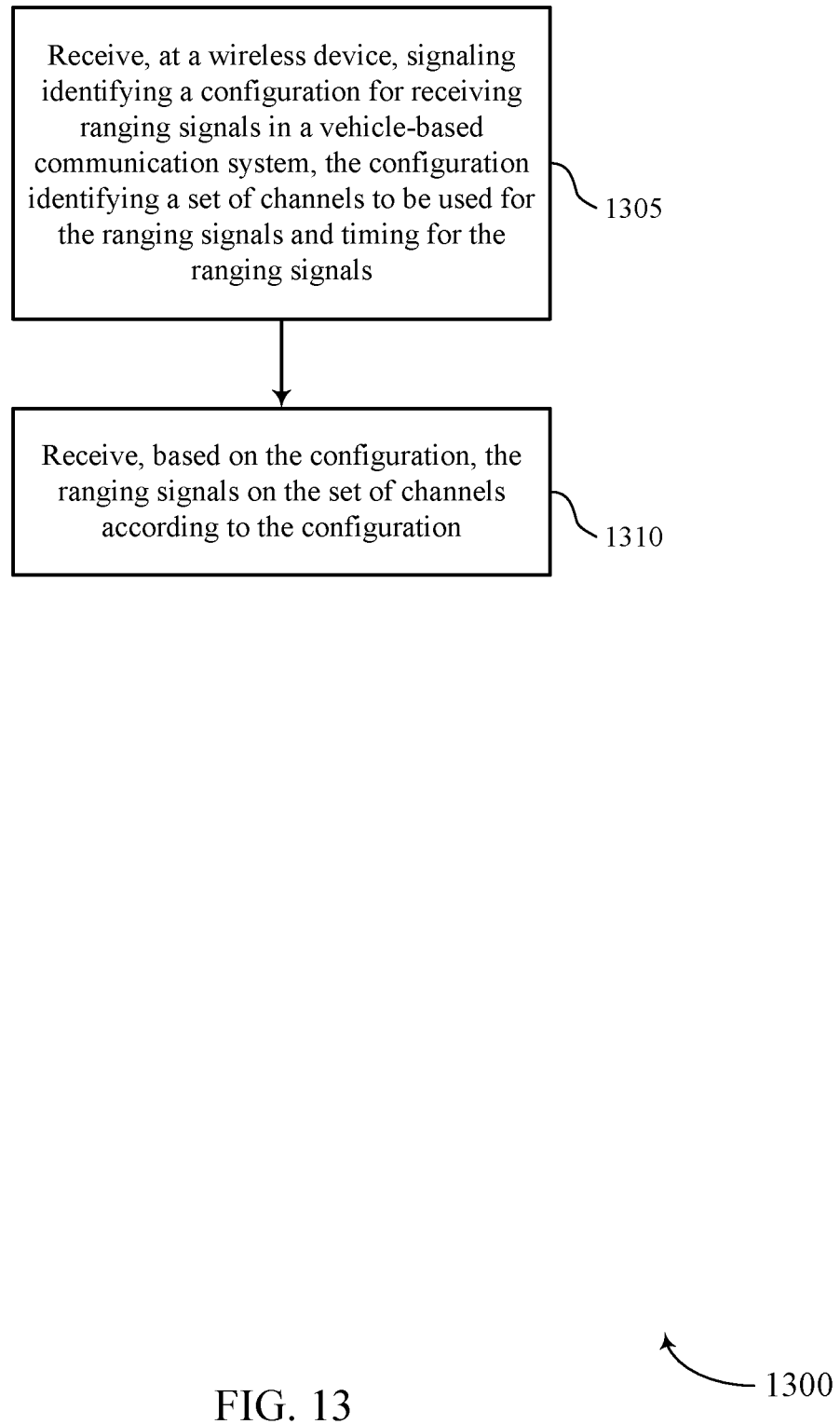

FIG. 13 shows a flowchart illustrating a method 1300 for configuring multi-channel transmission for ranging accuracy in accordance with one or more aspects of the present disclosure. The operations of method 1300 may be implemented by a wireless device such as first motor vehicle 205, second motor vehicle 210, RSU 215, transmitting device 305, receiving device 310 or its components as described herein. For example, the operations of method 1300 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1305 the wireless device may receive, at a wireless device, signaling identifying a configuration for receiving ranging signals in a vehicle-based communication system, the configuration identifying a plurality of channels to be used for the ranging signals and timing for the ranging signals. The operations of block 1305 may be performed according to the methods described herein. In certain examples, aspects of the operations of block 1305 may be performed by a receiver as described with reference to FIGS. 7 through 10.

At block 1310 the wireless device may receive, based at least in part on the configuration, the ranging signals on the plurality of channels according to the configuration. The operations of block 1310 may be performed according to the methods described herein. In certain examples, aspects of the operations of block 1310 may be performed by a receiver as described with reference to FIGS. 7 through 10.

Figure 14:
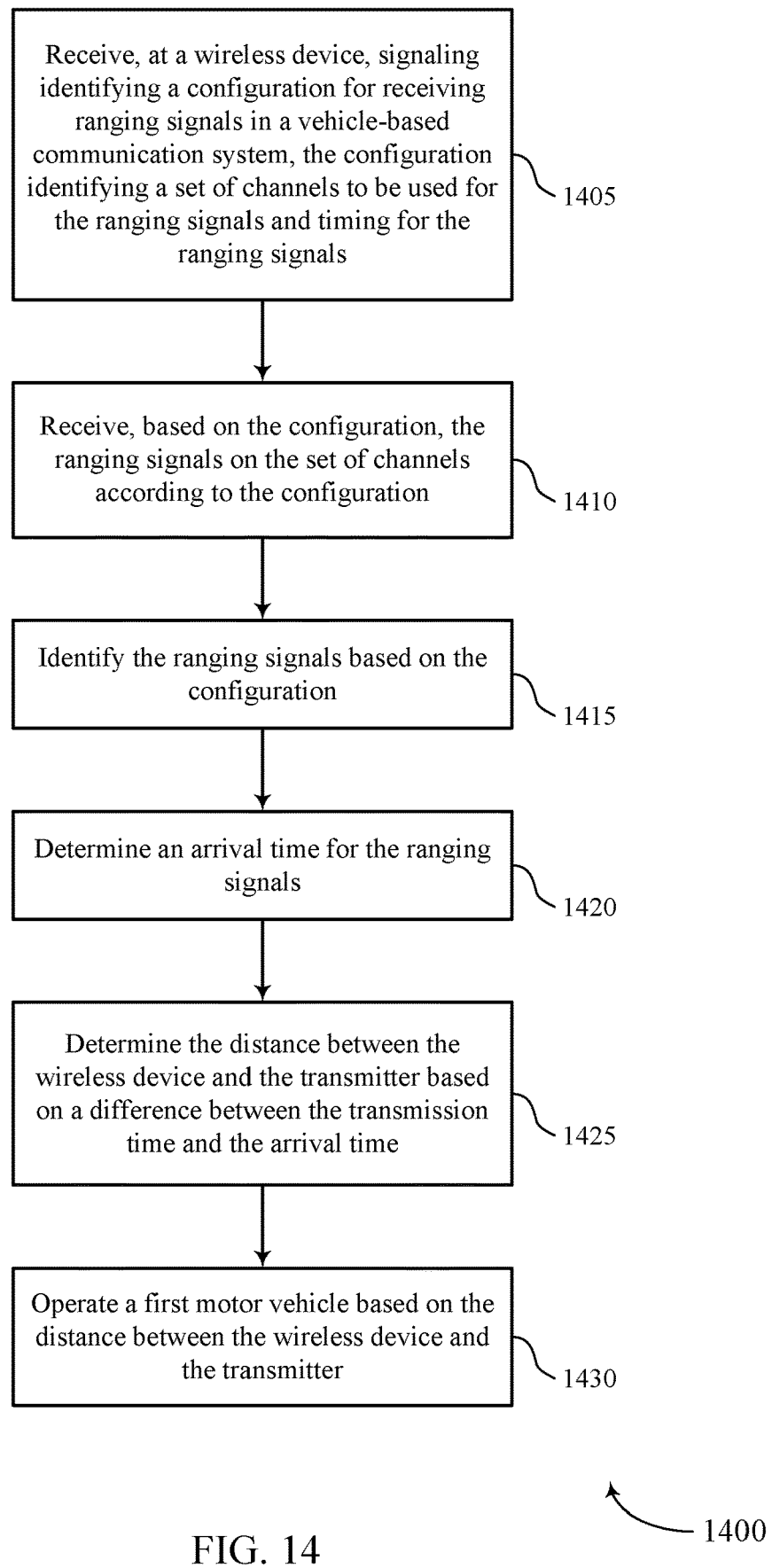

FIG. 14 shows a flowchart illustrating a method 1400 for configuring multi-channel transmission for ranging accuracy in accordance with one or more aspects of the present disclosure. The operations of method 1400 may be implemented by a wireless device such as first motor vehicle 205, second motor vehicle 210, RSU 215, transmitting device 305, receiving device 310 or its components as described herein. For example, the operations of method 1400 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1405 the wireless device may receive, at a wireless device, signaling identifying a configuration for receiving ranging signals in a vehicle-based communication system, the configuration identifying a plurality of channels to be used for the ranging signals and timing for the ranging signals. The operations of block 1405 may be performed according to the methods described herein. In certain examples, aspects of the operations of block 1405 may be performed by a receiver as described with reference to FIGS. 7 through 10.

At block 1410 the wireless device may receive, based at least in part on the configuration, the ranging signals on the plurality of channels according to the configuration. The operations of block 1410 may be performed according to the methods described herein. In certain examples, aspects of the operations of block 1410 may be performed by a receiver as described with reference to FIGS. 7 through 10.

At block 1415 the wireless device may identify the ranging signals based at least in part on the configuration. The operations of block 1415 may be performed according to the methods described herein. In certain examples, aspects of the operations of block 1415 may be performed by a ranging signal identifier as described with reference to FIGS. 7 through 10.

At block 1420 the wireless device may determine an arrival time for the ranging signals. The operations of block 1420 may be performed according to the methods described herein. In certain examples, aspects of the operations of block 1420 may be performed by a distance determination unit as described with reference to FIGS. 7 through 10.

At block 1425 the wireless device may determine the distance between the wireless device and the transmitter based at least in part on a difference between the transmission time and the arrival time. The operations of block 1425 may be performed according to the methods described herein. In certain examples, aspects of the operations of block 1425 may be performed by a distance determination unit as described with reference to FIGS. 7 through 10.

At block 1430 the wireless device may operate a first motor vehicle based at least in part on the distance between the wireless device and the transmitter. The operations of block 1430 may be performed according to the methods described herein. In certain examples, aspects of the operations of block 1430 may be performed by a navigation control unit as described with reference to FIGS. 7 through 10.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An gNB for a macro cell may be referred to as a macro gNB. An gNB for a small cell may be referred to as a small cell gNB, a pico gNB, a femto gNB, or a home gNB. A gNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining, by a first transceiver, a configuration for transmitting ranging signals, the ranging signals transmitted in one or more channels of a plurality of channels in a vehicle-based communication system, the configuration identifying one or more ranging signals, the plurality of channels to be used for transmitting at least one ranging signal of the one or more ranging signals, a data sequence included in each of the ranging signals, a transmitter identifier associated with the first transceiver, and timing for the one or more ranging signals, wherein the plurality of channels, the data sequence, the transmitter identifier, and the timing are used to identify the one or more ranging signals identified in the configuration as ranging signals; and
   transmitting a configuration transmission including the configuration to a second transceiver of a vehicle.

2. The method of claim 1, further comprising:
   transmitting the one or more ranging signals on the plurality of channels based at least in part on the configuration.

3. The method of claim 2, wherein transmitting the one or more ranging signals comprises:
   transmitting the one or more ranging signals simultaneously on the plurality of channels based at least in part on the configuration.

4. The method of claim 3, wherein transmitting the one or more ranging signals simultaneously comprises:
   transmitting the one or more ranging signals simultaneously on the plurality of channels comprises using carrier aggregation.

5. The method of claim 2, wherein transmitting the one or more ranging signals comprises:
   transmitting the one or more ranging signals on the plurality of channels during a transmission interval based at least in part on the configuration, each of the ranging signals being transmitted during a different time period during the transmission interval.

6. The method of claim 2, further comprising:
   receiving, from the second transceiver, information comprising an indication of a time elapsed between transmission and receipt of the one or more ranging signals, an indication of an arrival time of the one or more ranging signals, or a combination thereof.

7. The method of claim 6, further comprising:
   updating a positioning information based at least in part on the information received from the second transceiver.

8. The method of claim 1, wherein transmitting the configuration transmission to the second transceiver comprises:
   transmitting the configuration to the second transceiver in a broadcast message.

9. The method of claim 1, wherein transmitting the configuration transmission to the second transceiver comprises:
   transmitting the configuration to the second transceiver in a dedicated message addressed to the second transceiver.

10. The method of claim 1, wherein:
    the configuration comprises a transceiver identifier corresponding to the first transceiver, an identification of a channel for each of the ranging signals, a time schedule for the ranging signals, or a combination thereof.

11. The method of claim 10, further comprising:
    transmitting each of the ranging signals on the channel identified in the configuration.

12. The method of claim 10, further comprising:
    transmitting one or more data sequences on each of the plurality of channels.

13. The method of claim 10, further comprising:
    transmitting the one or more ranging signals according to the time schedule.

14. The method of claim 1, further comprising:
    transmitting offset information to the second transceiver, the offset information comprising phase offset information for the one or more ranging signals, time offset information for the one or more ranging signals, or a combination thereof.

15. The method of claim 14, wherein:
    the offset information is transmitted with the configuration.

16. The method of claim 1, wherein:
    a road side unit comprises the first transceiver and a motor vehicle comprises the second transceiver.

17. The method of claim 1, wherein:
    a first motor vehicle comprises the first transceiver and a second motor vehicle comprises the second transceiver.

18. The method of claim 16, wherein:
    the first transceiver comprises a base station or network entity.

19. A method for wireless communication, comprising:
    receiving from a transceiver, at a wireless device of a vehicle, a configuration transmission including signaling identifying a configuration for receiving ranging signals in a vehicle-based communication system, the configuration identifying one or more ranging signals, a plurality of channels to be used for receiving at least one ranging signal of the one or more ranging signals, a data sequence included in each of the ranging signals, a transmitter identifier associated with the transceiver, and timing for the one or more ranging signals, wherein the plurality of channels, the data sequence, the transmitter identifier, and the timing are used to identify the one or more ranging signals identified in the configuration as ranging signals; and receiving from the transceiver, based at least in part on the configuration, one or more ranging signal transmissions including the one or more ranging signals on the plurality of channels according to the configuration.

20. The method of claim 19, wherein receiving the one or more ranging signals comprises:
receiving the one or more ranging signals simultaneously on the plurality of channels based at least in part on the configuration.

21. The method of claim 19, wherein receiving the one or more ranging signals comprises:
receiving the one or more ranging signals on the plurality of channels during a reception interval based at least in part on the configuration, each of the ranging signals being received during a different time period during the reception interval.

22. The method of claim 19, further comprising:
identifying the one or more ranging signals based at least in part on the configuration.

23. The method of claim 22, wherein:
the configuration comprises a transceiver identifier corresponding to the transceiver, an identification of a channel for each of the ranging signals, a time schedule for the ranging signals, or a combination thereof.

24. The method of claim 23, wherein identifying the one or more ranging signals comprises:
identifying the one or more ranging signals based at least in part on the transceiver identifier included in the one or more ranging signals.

25. The method of claim 23, wherein identifying the one or more ranging signals comprises:
identifying the one or more ranging signals based at least in part on the channel identified in the configuration for each of the ranging signals.

26. The method of claim 23, wherein identifying the one or more ranging signals comprises:
identifying one or more ranging signals based at least in part on the data sequences included in each of the identified ranging signals.

27. The method of claim 23, wherein identifying the one or more ranging signals comprises:
identifying the one or more ranging signals based at least in part on the time schedule for the ranging signals.

28. The method of claim 19, further comprising:
determining, based at least in part on the one or more ranging signals, a distance between the wireless device and the transceiver.

29. The method of claim 28, wherein determining the distance comprises:
determining a transmission time for the one or more ranging signals based at least in part on the configuration, the ranging signals, or a combination thereof, the method further comprising:
determining an arrival time for the one or more ranging signals; and
determining the distance between the wireless device and the transceiver based at least in part on a difference between the transmission time and the arrival time.

30. The method of claim 29, wherein determining the arrival time comprises:
determining a channel frequency response for each of the plurality of channels, the method further comprising:
determining, based at least in part on the channel frequency response for each of the plurality of channels, a combined channel frequency response for the plurality of channels; and
determining the arrival time based at least in part on the combined channel frequency response.

31. The method of claim 19, further comprising:
updating positioning information based at least in part on a distance between the wireless device and the transceiver.

32. The method of claim 19, wherein:
a motor vehicle comprises the wireless device and a road side unit comprises the transceiver.

33. The method of claim 19, further comprising:
operating a first motor vehicle based at least in part on a distance between the wireless device and the transceiver.

34. The method of claim 19, wherein:
a first motor vehicle comprises the wireless device and a second motor vehicle comprises the transceiver.

35. The method of claim 19, further comprising:
receiving offset information, the offset information comprising phase offset information for the one or more ranging signals, time offset information for the one or more ranging signals, or a combination thereof.

36. The method of claim 35, wherein:
the offset information is received with the configuration.

37. The method of claim 35, wherein:
a distance between the wireless device and the transceiver is determined based at least in part on the offset information.

38. A first vehicle for wireless communication, comprising: a processor; a first transceiver; and memory coupled with the processor, wherein the processor is configured to:
determine, by the first transceiver, a configuration for transmitting ranging signals, the ranging signals transmitted in one or more channels of a plurality of channels in a vehicle-based communication system, the configuration identifying one or more ranging signals, the plurality of channels to be used for transmitting at least one ranging signal of the one or more ranging signals, a data sequence included in each of the ranging signals, a transmitter identifier associated with the first transceiver, and timing for the one or more ranging signals, wherein the plurality of channels, the data sequence, the transmitter identifier, and the timing are used to identify the one or more ranging signals identified in the configuration as ranging signals; and
transmit a configuration transmission including the configuration to a second transceiver at a second vehicle.

39. The first vehicle of claim 38, wherein the processor is further configured to:
transmit the one or more ranging signals on the plurality of channels based at least in part on the configuration.

40. The first vehicle of claim 39, wherein, to transmit the one or more ranging signals, the processor is configured to:
transmit the one or more ranging signals simultaneously on the plurality of channels based at least in part on the configuration.

41. The first vehicle of claim 40, wherein, to transmit the one or more ranging signals simultaneously, the processor is configured to:
transmit the one or more ranging signals simultaneously on the plurality of channels comprises using carrier aggregation.

42. The first vehicle of claim 39, wherein, to transmit the one or more ranging signals, the processor is configured to:
transmit the one or more ranging signals on the plurality of channels during a transmission interval based at least in part on the configuration, each of the ranging signals being transmitted during a different time period during the transmission interval.

43. The first vehicle of claim 39, wherein the processor is further configured to:
receive, from the second transceiver, information comprising an indication of a time elapsed between transmission and receipt of the one or more ranging signals, an indication of an arrival time of the one or more ranging signals, or a combination thereof.

44. The first vehicle of claim 43, wherein the processor is further configured to:
update a positioning information based at least in part on the information received from the second transceiver.

45. The first vehicle of claim 38, wherein, to transmit the configuration transmission to the second transceiver, the processor is configured to:
transmit the configuration to the second transceiver in a broadcast message.

46. The first vehicle of claim 38, wherein, to transmit the configuration transmission to the second transceiver, the processor is configured to:
transmit the configuration to the second transceiver in a dedicated message addressed to the second transceiver.

47. The first vehicle of claim 38, wherein the configuration comprises a second transceiver identifier corresponding to the second transceiver, an identification of a channel for each of the ranging signals, a time schedule for the ranging signals, or a combination thereof.

48. The first vehicle of claim 47, wherein the processor is further configured to:
transmit each of the ranging signals on the channel identified in the configuration.

49. The first vehicle of claim 47, wherein the processor is further configured to:
transmit one or more data sequences on each of the plurality of channels.

50. The first vehicle of claim 47, wherein the processor is further configured to:
transmit the one or more ranging signals according to the time schedule.

51. The first vehicle of claim 38, wherein the processor is further configured to:
transmit offset information to the second transceiver, the offset information comprising phase offset information for the one or more ranging signals, time offset information for the one or more ranging signals, or a combination thereof.

52. The first vehicle of claim 51, wherein the offset information is transmitted with the configuration.

53. The first vehicle of claim 38, wherein a road side unit comprises the first transceiver and a motor vehicle comprises the second transceiver.

54. The first vehicle of claim 38, wherein a first motor vehicle comprises the first transceiver and a second motor vehicle comprises the second transceiver.

55. The first vehicle of claim 38, wherein the first transceiver comprises a base station or network entity.

56. A first vehicle for wireless communication, comprising: a processor; a first transceiver; and memory coupled with the processor, wherein the processor is configured to:
receive from a second transceiver, at a second vehicle, a configuration transmission including signaling identifying a configuration for receiving ranging signals in a vehicle-based communication system, the configuration identifying one or more ranging signals, a plurality of channels to be used for receiving at least one ranging signal of the one or more ranging signals, a data sequence included in each of the ranging signals, a transmitter identifier associated with the second transceiver, and timing for the one or more ranging signals, wherein the plurality of channels, the data sequence, the transmitter identifier, and the timing are used to identify the one or more ranging signals identified in the configuration as ranging signals; and
receive from the second transceiver, based at least in part on the configuration, one or more ranging signal transmissions including the one or more ranging signals on the plurality of channels according to the configuration.

57. The first vehicle of claim 56, wherein, to receive the one or more ranging signal transmissions, the processor is configured to:
receive the one or more ranging signals simultaneously on the plurality of channels based at least in part on the configuration.

58. The first vehicle of claim 56, wherein, to receive the one or more ranging signals simultaneously, the processor is configured to:
receive the one or more ranging signals on the plurality of channels during a reception interval based at least in part on the configuration, each of the ranging signals being received during a different time period during the reception interval.

59. The first vehicle of claim 56, wherein the processor is further configured to:
identify the one or more ranging signals based at least in part on the configuration.

60. The first vehicle of claim 59, wherein the configuration comprises a second transceiver identifier corresponding to the second transceiver, an identification of a channel for each of the ranging signals, a time schedule for the ranging signals, or a combination thereof.

61. The first vehicle of claim 60, wherein, to identify the one or more ranging signals, the processor is configured to:
identify the one or more ranging signals based at least in part on the second transceiver identifier included in the one or more ranging signals.

62. The first vehicle of claim 60, wherein, to identify the one or more ranging signals, the processor is configured to:
identify the one or more ranging signals based at least in part on the channel identified in the configuration for each of the ranging signals.

63. The first vehicle of claim 60, wherein, to identify the one or more ranging signals, the processor is configured to:
identify one or more ranging signals based at least in part on the data sequences included in each of the identified ranging signals.

64. The first vehicle of claim 60, wherein, to identify the one or more ranging signals, the processor is configured to:
identify the one or more ranging signals based at least in part on the time schedule for the ranging signals.

65. The first vehicle of claim 56, wherein the processor is further configured to:

determine, based at least in part on the one or more ranging signals, a distance between the second vehicle and the first transceiver.

66. The first vehicle of claim 65, wherein, to determine the distance, the processor is configured to:
   determine a transmission time for the one or more ranging signals based at least in part on the configuration, the ranging signals, or a combination thereof, the processor further configured to:
      determine an arrival time for the one or more ranging signals; and
      determine the distance between the second vehicle and the first transceiver based at least in part on a difference between the transmission time and the arrival time.

67. The first vehicle of claim 66, wherein, to determine the arrival time, the processor is configured to:
   determine a channel frequency response for each of the plurality of channels, the processor further configured to:
      determine, based at least in part on the channel frequency response for each of the plurality of channels, a combined channel frequency response for the plurality of channels; and
      determine the arrival time based at least in part on the combined channel frequency response.

68. The first vehicle of claim 56, wherein the processor is further configured to:
   update positioning information based at least in part on a distance between the second vehicle and the first transceiver.

69. The first vehicle of claim 56, wherein a motor vehicle comprises the second vehicle and a road side unit comprises the first transceiver.

70. The first vehicle of claim 56, wherein the processor is further configured to:
   operate the first vehicle based at least in part on a distance between the second vehicle and the first transceiver.

71. The first vehicle of claim 56, wherein a first motor vehicle comprises the second vehicle and a second motor vehicle comprises the first transceiver.

72. The first vehicle of claim 56, wherein the processor is further configured to:
   receive offset information, the offset information comprising phase offset information for the one or more ranging signals, time offset information for the one or more ranging signals, or a combination thereof.

73. The first vehicle of claim 72, wherein the offset information is received with the configuration.

74. The first vehicle of claim 72, wherein a distance between the second vehicle and the first transceiver is determined based at least in part on the offset information.

75. A non-transitory computer-readable medium storing code for wireless communication, the code comprising instructions executable by a processor to:
   determine, by a first transceiver, a configuration for transmitting ranging signals, the ranging signals transmitted in one or more channels of a plurality of channels in a vehicle-based communication system, the configuration identifying one or more ranging signals, the plurality of channels to be used for transmitting at least one ranging signal of the one or more ranging signals, a data sequence included in each of the ranging signals, a transmitter identifier associated with the first transceiver, and timing for the one or more ranging signals, wherein the plurality of channels, the data sequence, the transmitter identifier, and the timing are used to identify the one or more ranging signals identified in the configuration as ranging signals; and
   transmit a configuration transmission including the configuration to a second transceiver.

76. A non-transitory computer-readable medium storing code for wireless communication, the code comprising instructions executable by a processor to:
   receive, from a transceiver, at a wireless device, a configuration transmission including signaling identifying a configuration for receiving ranging signals in a vehicle-based communication system, the configuration identifying one or more ranging signals, a plurality of channels to be used for receiving at least one ranging signal of the one or more ranging signals, a data sequence included in each of the ranging signals, a transmitter identifier associated with the transceiver, and timing for the one or more ranging signals, wherein the plurality of channels, the data sequence, the transmitter identifier, and the timing are used to identify the one or more ranging signals identified in the configuration as ranging signals; and
   receive, based at least in part on the configuration, one or more ranging signal transmissions including the one or more ranging signals on the plurality of channels according to the configuration.

77. A first vehicle for wireless communication, comprising:
   means for determining, by a first transceiver at the first vehicle, a configuration for transmitting ranging signals, the ranging signals transmitted in one or more channels of a plurality of channels in a vehicle-based communication system, the configuration identifying one or more ranging signals, the plurality of channels to be used for transmitting at least one ranging signal of the one or more ranging signals, a data sequence included in each of the ranging signals, a transmitter identifier associated with the first transceiver, and timing for the one or more ranging signals, wherein the plurality of channels, the data sequence, the transmitter identifier, and the timing are used to identify the one or more ranging signals identified in the configuration as ranging signals; and
   means for transmitting a configuration transmission including the configuration to a second transceiver at a second vehicle.

78. A first vehicle for wireless communication, comprising:
   means for receiving at a first transceiver at the first vehicle, from a second transceiver at a second vehicle, a configuration transmission including signaling identifying a configuration for receiving ranging signals in a vehicle-based communication system, the configuration identifying one or more ranging signals, a plurality of channels to be used for receiving at least one ranging signal of the one or more ranging signals, a data sequence included in each of the ranging signals, a transmitter identifier associated with the second transceiver, and timing for the one or more ranging signals, wherein the plurality of channels, the data sequence, the transmitter identifier, and the timing are used to identify the one or more ranging signals identified in the configuration as ranging signals; and
   means for receiving at the first transceiver, from the second transceiver and based at least in part on the configuration, one or more ranging signal transmissions including the one or more ranging signals on the plurality of channels according to the configuration.

\* \* \* \* \*